United States Patent
Gramelspacher et al.

(10) Patent No.: US 8,798,133 B2
(45) Date of Patent: Aug. 5, 2014

(54) DUAL CHANNEL ENCODING AND DETECTION

(75) Inventors: Michael S. Gramelspacher, Greenfield, IL (US); Edward J. Koplar, St. Louis, MO (US)

(73) Assignee: Koplar Interactive Systems International L.L.C., St. Louis, MO (US)

( * ) Notice: Subject to any disclaimer, the term of this patent is extended or adjusted under 35 U.S.C. 154(b) by 1024 days.

(21) Appl. No.: 12/324,058

(22) Filed: Nov. 26, 2008

(65) Prior Publication Data

US 2009/0141793 A1 Jun. 4, 2009

Related U.S. Application Data

(60) Provisional application No. 60/991,119, filed on Nov. 29, 2007.

(51) Int. Cl.
*H04N 7/12* (2006.01)

(52) U.S. Cl.
USPC .................................................. 375/240.01

(58) Field of Classification Search
USPC ........................................ 375/240.01, 240.1
IPC ...................................................... H04N 7/12
See application file for complete search history.

(56) References Cited

U.S. PATENT DOCUMENTS

| | | |
|---|---|---|
| 3,743,768 A | 7/1973 | Copland |
| 4,101,927 A | 7/1978 | Isono et al. |
| 4,454,507 A | 6/1984 | Srinivasan et al. |
| 4,503,288 A | 3/1985 | Kessler |
| 4,504,852 A | 3/1985 | Ducret |
| 4,540,880 A | 9/1985 | Hipko |
| 4,620,877 A | 11/1986 | Skukowski |
| 4,642,682 A | 2/1987 | Orsburn et al. |

(Continued)

FOREIGN PATENT DOCUMENTS

| | | |
|---|---|---|
| EP | 7133335 | 5/1996 |
| GB | 2161629 | 1/1986 |

(Continued)

OTHER PUBLICATIONS

U.S. Appl. No. 10/888,919, Non-Final Office Action mailed Apr. 7, 2005, 7 pgs.

(Continued)

*Primary Examiner* — Dave Czekaj
*Assistant Examiner* — Tracy Li
(74) *Attorney, Agent, or Firm* — Christopher R. Carroll; The Small Patent Law Group LLC

(57) ABSTRACT

Methods and systems for dual channel encoding and detection are described. In one embodiment, auxiliary data may be encoded in an audio portion of one or more frames of a content signal based on an audio encoding technique. The auxiliary data may be encoded in a video portion of the one or more frames based on a video encoding technique. The encoding of the auxiliary data in the audio portion and the video portion may produce a modulated content signal. The modulated content signal may include one or more dual encoded frames. The dual encoded frames may include the auxiliary data encoded within the audio portion and the video portion of the one or more frames. Additional methods and systems are disclosed.

20 Claims, 18 Drawing Sheets

(56) References Cited

U.S. PATENT DOCUMENTS

| | | |
|---|---|---|
| 4,656,342 A | 4/1987 | Ugon |
| 4,688,102 A | 8/1987 | Edakubo et al. |
| 4,689,673 A | 8/1987 | Ohki et al. |
| 4,691,245 A | 9/1987 | Hickok |
| 4,745,468 A | 5/1988 | Von Kohorn |
| 4,789,371 A | 12/1988 | Boggs et al. |
| 4,807,031 A | 2/1989 | Broughton et al. |
| 4,851,651 A | 7/1989 | Gaucher |
| 4,876,592 A | 10/1989 | Von Kohorn |
| 4,914,694 A | 4/1990 | Leonard et al. |
| 4,926,255 A | 5/1990 | Von Kohorn |
| 4,969,041 A | 11/1990 | O'Grady et al. |
| 5,034,807 A | 7/1991 | Von Kohorn |
| 5,057,845 A * | 10/1991 | Gellekink .................... 342/137 |
| 5,057,915 A | 10/1991 | Von Kohorn |
| 5,070,404 A | 12/1991 | Bullock et al. |
| 5,099,322 A | 3/1992 | Gove |
| 5,122,873 A * | 6/1992 | Golin ...................... 375/240.23 |
| 5,128,752 A | 7/1992 | Von Kohorn |
| 5,134,484 A | 7/1992 | Willson |
| 5,136,644 A | 8/1992 | Audebert et al. |
| 5,151,779 A * | 9/1992 | Kanatsugu et al. ...... 375/240.25 |
| 5,200,822 A | 4/1993 | Bronfin et al. |
| 5,214,792 A | 5/1993 | Alwadish |
| 5,227,874 A | 7/1993 | Von Kohorn |
| 5,233,423 A | 8/1993 | Jernigan et al. |
| 5,243,423 A | 9/1993 | DeJean et al. |
| 5,249,044 A | 9/1993 | Von Kohorn |
| 5,253,345 A | 10/1993 | Fernandes et al. |
| 5,262,860 A | 11/1993 | Fitzpatrick et al. |
| 5,283,734 A | 2/1994 | Von Kohorn |
| 5,285,278 A | 2/1994 | Holman |
| 5,287,181 A | 2/1994 | Holman |
| 5,301,353 A | 4/1994 | Berras et al. |
| 5,333,091 A | 7/1994 | Iggulden et al. |
| 5,343,239 A | 8/1994 | Lappington et al. |
| 5,410,326 A | 4/1995 | Goldstein |
| 5,423,555 A | 6/1995 | Kidron |
| 5,455,629 A | 10/1995 | Sun et al. |
| 5,461,426 A | 10/1995 | Limberg et al. |
| 5,483,276 A | 1/1996 | Brooks et al. |
| 5,488,423 A | 1/1996 | Walkingshaw et al. |
| 5,488,571 A | 1/1996 | Jacobs et al. |
| 5,500,681 A | 3/1996 | Jones |
| 5,510,845 A | 4/1996 | Yang et al. |
| 5,523,794 A | 6/1996 | Mankovitz et al. |
| 5,526,035 A | 6/1996 | Lappington et al. |
| 5,535,147 A | 7/1996 | Jacobs et al. |
| 5,550,578 A | 8/1996 | Hoarty et al. |
| 5,555,024 A | 9/1996 | Limberg |
| 5,557,333 A | 9/1996 | Jungo et al. |
| 5,561,467 A | 10/1996 | Takeuchi et al. |
| 5,577,266 A | 11/1996 | Takahisa et al. |
| 5,594,493 A | 1/1997 | Nemirofsky |
| 5,617,137 A | 4/1997 | Whitlow |
| 5,675,395 A | 10/1997 | Martin et al. |
| 5,691,828 A | 11/1997 | Weiss et al. |
| 5,697,844 A | 12/1997 | Von Kohorn |
| 5,699,174 A | 12/1997 | Weiss et al. |
| 5,708,476 A | 1/1998 | Myhrvold et al. |
| 5,717,697 A | 2/1998 | Yin |
| 5,734,413 A | 3/1998 | Lappington et al. |
| 5,737,417 A | 4/1998 | Buynak et al. |
| 5,739,866 A | 4/1998 | Kim et al. |
| 5,742,743 A | 4/1998 | Weiss |
| 5,742,845 A | 4/1998 | Wagner |
| 5,745,596 A | 4/1998 | Jefferson |
| 5,745,604 A | 4/1998 | Rhoads |
| 5,761,601 A | 6/1998 | Nemirofsky et al. |
| 5,764,275 A | 6/1998 | Lappington et al. |
| 5,767,896 A | 6/1998 | Namirofsky |
| 5,768,426 A | 6/1998 | Rhoads |
| 5,789,371 A | 8/1998 | Tracy et al. |
| 5,789,732 A | 8/1998 | McMahon et al. |
| 5,815,127 A | 9/1998 | Jacobs et al. |
| 5,815,217 A | 9/1998 | Kumazawa |
| 5,816,918 A | 10/1998 | Kelly et al. |
| 5,831,679 A | 11/1998 | Montgomery et al. |
| 5,831,688 A | 11/1998 | Yamada et al. |
| 5,835,388 A | 11/1998 | Helm |
| 5,850,481 A | 12/1998 | Rhoads |
| 5,852,429 A | 12/1998 | Scheffer et al. |
| 5,880,769 A | 3/1999 | Nemirofsky et al. |
| 5,907,350 A | 5/1999 | Nemirofsky |
| 5,946,635 A | 8/1999 | Dominguez |
| 5,953,047 A | 9/1999 | Nemirofsky |
| 5,960,081 A | 9/1999 | Vynne et al. |
| 5,999,688 A | 12/1999 | Iggulden et al. |
| 6,016,338 A | 1/2000 | Bansal et al. |
| 6,024,288 A | 2/2000 | Gottlich et al. |
| 6,044,182 A | 3/2000 | Daly et al. |
| 6,045,515 A | 4/2000 | Lawton |
| 6,058,191 A | 5/2000 | Quan |
| 6,061,094 A | 5/2000 | Maietta |
| 6,061,660 A | 5/2000 | Eggleston et al. |
| 6,068,183 A | 5/2000 | Freeman et al. |
| 6,076,069 A | 6/2000 | Laor |
| 6,091,822 A | 7/2000 | Mellows et al. |
| 6,094,228 A | 7/2000 | Ciardullo et al. |
| 6,097,877 A | 8/2000 | Katayama et al. |
| 6,100,883 A | 8/2000 | Hoarty |
| 6,104,334 A | 8/2000 | Allport |
| 6,122,392 A | 9/2000 | Rhoads |
| 6,177,950 B1 | 1/2001 | Robb |
| 6,223,348 B1 | 4/2001 | Hayes et al. |
| 6,229,572 B1 | 5/2001 | Ciardullo et al. |
| 6,232,955 B1 | 5/2001 | Guttag et al. |
| 6,256,019 B1 | 7/2001 | Allport |
| 6,256,070 B1 | 7/2001 | Frank |
| 6,266,430 B1 | 7/2001 | Rhoads |
| 6,278,499 B1 | 8/2001 | Darbee et al. |
| 6,282,654 B1 | 8/2001 | Ikeda et al. |
| 6,327,573 B1 | 12/2001 | Walker et al. |
| 6,330,034 B1 | 12/2001 | Renner et al. |
| 6,347,114 B1 | 2/2002 | Blanchard |
| 6,351,289 B1 | 2/2002 | Chen et al. |
| 6,351,493 B1 | 2/2002 | Reed et al. |
| 6,366,705 B1 | 4/2002 | Chiu et al. |
| 6,370,272 B1 | 4/2002 | Shimizu |
| 6,370,275 B1 | 4/2002 | Benoit et al. |
| 6,400,827 B1 | 6/2002 | Rhoads |
| 6,404,440 B1 | 6/2002 | Doyen et al. |
| 6,404,898 B1 | 6/2002 | Rhoads |
| 6,421,497 B1 | 7/2002 | Quan |
| 6,449,379 B1 | 9/2002 | Rhoads |
| 6,512,835 B1 | 1/2003 | Numao et al. |
| 6,539,055 B1 | 3/2003 | Hazra |
| 6,549,669 B1 | 4/2003 | Sundqvist et al. |
| 6,571,220 B1 | 5/2003 | Ogino et al. |
| 6,592,044 B1 | 7/2003 | Wong et al. |
| 6,600,873 B1 | 7/2003 | Brill et al. |
| 6,647,129 B2 | 11/2003 | Rhoads |
| 6,661,905 B1 | 12/2003 | Chupp et al. |
| 6,674,876 B1 | 1/2004 | Hannigan et al. |
| 6,681,393 B1 | 1/2004 | Bauminger et al. |
| 6,681,905 B2 | 1/2004 | Edmondson et al. |
| 6,701,062 B1 | 3/2004 | Talstra et al. |
| 6,731,684 B1 | 5/2004 | Wu |
| 6,748,114 B1 | 6/2004 | Ishikawa |
| 6,751,398 B2 | 6/2004 | Agnihotri et al. |
| 6,766,098 B1 | 7/2004 | McGee et al. |
| 6,778,682 B2 | 8/2004 | Rhoads |
| 6,826,352 B1 | 11/2004 | Quan |
| 6,836,549 B1 | 12/2004 | Quan et al. |
| 6,842,160 B2 | 1/2005 | Yamazaki et al. |
| 6,845,213 B2 | 1/2005 | Maas et al. |
| 6,975,746 B2 | 12/2005 | Davis et al. |
| 6,987,862 B2 | 1/2006 | Rhoads |
| 7,057,666 B2 | 6/2006 | Folio |
| 7,071,994 B2 | 7/2006 | Harris et al. |
| 7,116,374 B2 | 10/2006 | Chupp et al. |
| 7,167,209 B2 | 1/2007 | Cookson et al. |
| 7,213,254 B2 | 5/2007 | Koplar et |
| 7,286,188 B2 | 10/2007 | Chupp et al. |

(56) References Cited

U.S. PATENT DOCUMENTS

| | | | |
|---|---|---|---|
| 7,296,282 | B1 | 11/2007 | Koplar et al. |
| 7,536,705 | B1* | 5/2009 | Boucher et al. ............... 725/112 |
| 7,552,456 | B2 | 6/2009 | Ciardullo et al. |
| 7,590,992 | B2 | 9/2009 | Koplar et al. |
| 7,627,879 | B2 | 12/2009 | Koplar et al. |
| 7,873,104 | B2* | 1/2011 | Kim et al. ............... 375/240.02 |
| 8,020,181 | B2 | 9/2011 | Koplar et al. |
| 2002/0061119 | A1 | 5/2002 | Powell et al. |
| 2002/0085635 | A1 | 7/2002 | Kim et al. |
| 2002/0089473 | A1 | 7/2002 | Yamazaki et al. |
| 2002/0090114 | A1* | 7/2002 | Rhoads et al. ............... 382/100 |
| 2002/0112250 | A1 | 8/2002 | Koplar et al. |
| 2002/0183102 | A1 | 12/2002 | Withers et al. |
| 2003/0072370 | A1 | 4/2003 | Girod et al. |
| 2004/0240846 | A1 | 12/2004 | Cookson et al. |
| 2005/0024536 | A1 | 2/2005 | Cookson et al. |
| 2005/0031034 | A1 | 2/2005 | Kamaci et al. |
| 2005/0083436 | A1 | 4/2005 | Reynolds et al. |
| 2005/0117888 | A1* | 6/2005 | Suzuki ............... 386/95 |
| 2005/0195327 | A1 | 9/2005 | Chupp et al. |
| 2005/0227715 | A1* | 10/2005 | Riedl et al. ............... 455/462 |
| 2006/0088222 | A1 | 4/2006 | Han et al. |
| 2006/0209209 | A1* | 9/2006 | Reynolds et al. ............ 348/473 |
| 2006/0274198 | A1 | 12/2006 | Chupp et al. |
| 2007/0116125 | A1 | 5/2007 | Wada et al. |
| 2007/0206676 | A1* | 9/2007 | Yamazaki ............... 375/240.12 |
| 2007/0223693 | A1 | 9/2007 | Van Leest |
| 2007/0226508 | A1 | 9/2007 | Maltagliati et al. |
| 2008/0056351 | A1 | 3/2008 | Chupp et al. |
| 2008/0123733 | A1 | 5/2008 | Yu et al. |
| 2008/0198923 | A1 | 8/2008 | Gramelspacher et al. |
| 2008/0208642 | A1 | 8/2008 | Koplar et al. |
| 2009/0257511 | A1 | 10/2009 | Jeong et al. |

FOREIGN PATENT DOCUMENTS

| | | |
|---|---|---|
| WO | 9843158 | 10/1998 |
| WO | 9904568 | 1/1999 |
| WO | 9934599 | 7/1999 |
| WO | 0117262 | 3/2001 |
| WO | 02084909 | 10/2002 |

OTHER PUBLICATIONS

U.S. Appl. No. 10/888,919, Non-Final Office Action mailed Dec. 1, 2005, 6 pgs.

U.S. Appl. No. 10/888,919, Non-Final Office Action mailed Aug. 11, 2005, 5 pgs.

U.S. Appl. No. 10/888,919, Notice of Allowance mailed May 16, 2006, 7 pgs.

U.S. Appl. No. 10/888,919, Preliminary Amendment filed Mar. 31, 2005, 14 pgs.

U.S. Appl. No. 10/888,919, Response filed Feb. 24, 2006 to Non-Final Office Action mailed Dec. 1, 2005, 17 pgs.

U.S. Appl. No. 10/888,919, Response filed Sep. 7, 2005 to Non-Final Office Action mailed Aug. 11, 2005, 12 pgs.

U.S. Appl. No. 10/888,919, Response filed May 13, 2005 to Non-Final Office Action mailed Apr. 7, 2005, 14 pgs.

U.S. Appl. No. 11/095,333 Preliminary Amendment filed Mar. 31, 2005, 17 pgs.

U.S. Appl. No. 11/095,333 Notice of Allowance mailed Jul. 29, 2005, 11 pgs.

U.S. Appl. No. 11/095,333 Response filed Jan. 10, 2005 to Notice of Allowance mailed Jul. 29, 2005, 3 pgs.

U.S. Appl. No. 11/095,334 Preliminary Amendment filed Mar. 31, 2005, 14 pgs.

U.S. Appl. No. 11/095,334, Non-Final Office Action mailed on Nov. 7, 2008, 9 pgs.

U.S. Appl. No. 11/095,334, Preliminary Amendment mailed Oct. 25, 2007, 7 pgs.

U.S. Appl. No. 11/465,234, Non-Final Office Action mailed May 1, 2007, 8 pgs.

U.S. Appl. No. 11/465,234, Notice of Allowance mailed May 31, 2007, 4 pgs.

U.S. Appl. No. 11/465,234, Response filed May 15, 2007 to Non-Final Office Action mailed May 1, 2007, 9 pgs.

Coursey, David, "Why Microsoft Caved in on Copy Protection", (Oct. 9, 2002), 1-2.

Written Opinion for related International Patent Application PCT/US00/24386 dated Jun. 22, 2001, 7 pages.

International Preliminary Examination Report for International Patent Application PCT/US00/24386 dated Nov. 21, 2001, 6 pages.

International Search Report for International Patent Application PCT/US00/24386 dated Jul. 14, 2005, 7 pgs.

European Search Report for EP00963318.1 dated Apr. 28, 2006, 5 pages.

Baer, "Interactive Television Prospects for Two-Way Services on Cable" A Report prepared under a Grant from The John and Mary R. Markle Foundation, R-888-MF, Nov. 1971, 97 pages.

Berman, "The Technical Advantages and Application of Digitally-Encoded Video in Fiber Optic Transmission Networks", A Comparative Analysis for Consulting Engineers, End-User, and System Integrators,Intelligent Transportation Systems, International Fiber Systems, Inc. Jul. 14, 2001, 11 pages.

Gray et al., "Algorithms and Components for Data Transmission and Video Encoding", Department of Electrical Engineering and Computer Sciences, University of California-Berkeley, Final Report 1997-98 for MICRO Project 97-118,6 pages.

Interactive Systems, Inc., Core Technology, Brochure, 18 pages.

Maney, "Cellphones or secret decoder rings?", USA Today, Jun. 21, 2000,3 pages.

McKellips, "The 100 Day Report", The International Journal of ITV, Summer 1993,15 pages.

Proceedings from Eleven Technical Sessions, 42nd Annual Convention and Exposition of the National Cable Television Association, Jun. 6-9, 1993,6 pages.

Sturiale, "PBS and TV Answer Team to Bring Interactivity to Public Television", Transactions "The Source" of information in and around the nation's leader in interactive television, Jun. 1993, 9 pages.

TV Answer Applications, "The Electronic Marketplace—Money Manager, Interactive Sports, Catalog Shopping, Grocery Shopping, TV Search and Universal Remote are just a few of the applications TV Answer brings to the viewers home", Apr. 1993, 30 pages.

TV Answer News Summary, Feb. 1993, 5 pages.

Van, "Motorola device would connect instantly to Net", SI. Louis Post-Dispatch, Business Section, Jul. 26, 2000, 1 page.

Wessel, "Gadget Envy, Masters of the New Economy, Americans Must Go Abroad to Find the Coolest Toys", The Wall Street Journal, Aug. 3, 2000.

\* cited by examiner

DUAL CHANNEL ENCODING AND DETECTION

CROSS-REFERENCE TO A RELATED APPLICATION

This application claims the benefit of United States Provisional Patent Application entitled "Dual Channel Encoding and Detection", Ser. No. 60/991,119, filed 29 Nov. 2007, the entire contents of which are herein incorporated by reference.

BACKGROUND

Auxiliary data may be encoded in a content signal (e.g., a video signal) at an encoder. The encoded content signal may then be broadcast and received for presentation on a display device.

BRIEF DESCRIPTION OF DRAWINGS

Embodiments are illustrated by way of example and not limitation in the figures of the accompanying drawings, in which like reference characters indicate similar elements and in which.

DETAILED DESCRIPTION

Example methods and systems for dual channel encoding and detection are described. In the following description, for purposes of explanation, numerous specific details are set forth in order to provide a thorough understanding of example embodiments. It will be evident, however, to one of ordinary skill in the art that embodiments of the invention may be practiced without these specific details.

A video signal may be encoded with auxiliary data in a video channel and an audio channel to produce a modulated video signal. The video channel may include a video portion of one or more frames of the modulated video signal. The audio channel may include an audio portion of the one or more frames of the video signal. Some of the frames of the video signal may be encoded in the video channel portion, while other frames of the video signal may be encoded in the audio channel portion. The frames of the video signal may be dual encoded with the auxiliary data in both the audio channel and the video channel. Test data may first be encoded into the video signal to determine which frames of the video signal could be used to encode auxiliary data in the video channel and/or the audio channel. One or more audio enabled frames and one or more video enabled frames may be identified among the available frames for encoding.

The modulated video signal may be decoded to reproduce the auxiliary data. Dual encoded frames of the modulated video signal may be decoded to reproduce the auxiliary data. Audio encoded frames and video encoded frames of the modulated video signal may be decoded to reproduce the auxiliary data. A message may be reproduced from decoding an analysis frame and the message may be used to decode additional frames of the modulated video signal.

Figure 1:
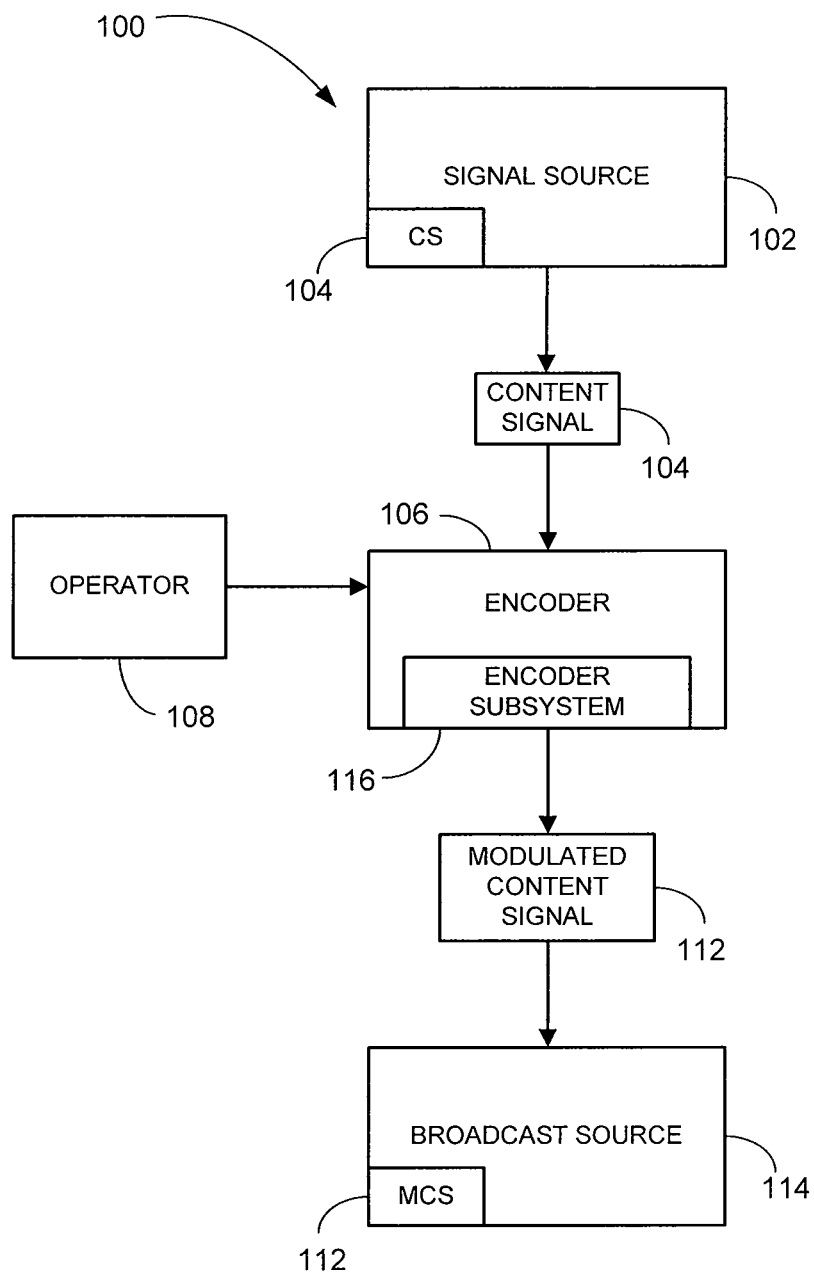
FIG. 1 is a block diagram illustrating an example encoding system.

FIG. 1 illustrates an example encoding system 100. The encoding system 100 is an example platform in which one or more embodiments of an encoding method may be used. However, other platforms may also be used.

A content signal 104 may be provided from a signal source 102 to an encoder 106 in the encoding system 100. The content signal 104 may include a sequence of images and optionally associated audio. Examples of the content signal 104 include standard definition (SD) and/or high definition (HD) content signals in NTSC (National Television Standards Committee), PAL (Phase Alternation Line), SECAM (Systeme Electronique Couleur Avec Memoire), a MPEG (Moving Picture Experts Group) signal, a sequence of JPEGs (Joint Photographic Experts Group) sequence of bitmaps, or other signal formats that transport of a sequence of images. The form of the content signal 104 may be modified to enable implementations involving the content signals 104 of various formats and resolutions.

The signal source 102 is a unit that is capable of providing and/or reproducing a sequence of images electrically in the form of the content signal 104. Examples of the signal source 102 include a professional grade video tape player with a video tape, a camcorder, a video file server, a computer with an output port, a digital versatile disc (DVD) player with a DVD disc, and the like. An example embodiment of the encoder 106 is described in greater detail below.

An operator 108 may interact with the encoder 106 to control its operation to encode auxiliary data, test data and/or a message within the content signal 104, thereby producing a modulated content signal 112 that may be provided to a broadcast source 114. In an example embodiment, the operator 108 may include a person that interacts with the encoder 106 through the use of a computer or other electronic control device. The operator 108 may consist entirely of hardware, firmware and/or software, or other electronic control device that directs operation of the encoder 106 in an automated manner.

The modulated content signal 112 may be provided to the broadcast source 114 for distribution and/or transmission to an end-user (e.g., a viewer) who may view the content associated with the modulated content signal 112. The broadcast source 114 may deliver the modulated content signal 112 to one or more viewers in formats including analog and/or digital video by storage medium such as DVD, tapes, and other fixed medium and/or by transmission sources such as television broadcast stations, cable, satellite, wireless and Internet sources that broadcast or otherwise transmit content. The modulated content signal 112 may be encoded at the broadcast source 114 prior to delivering the modulated content signal 112 to the one or more viewers. Additional encoding (e.g., MPEG encoding) may occur at the encoder 106, the broadcast source 114, or anywhere else in the production chain after encoding.

An encoded subsystem 116 may be deployed with the encoder 106 to modulate auxiliary data in the content signal 104, thereby producing the modulated content signal 112.

Figure 2:
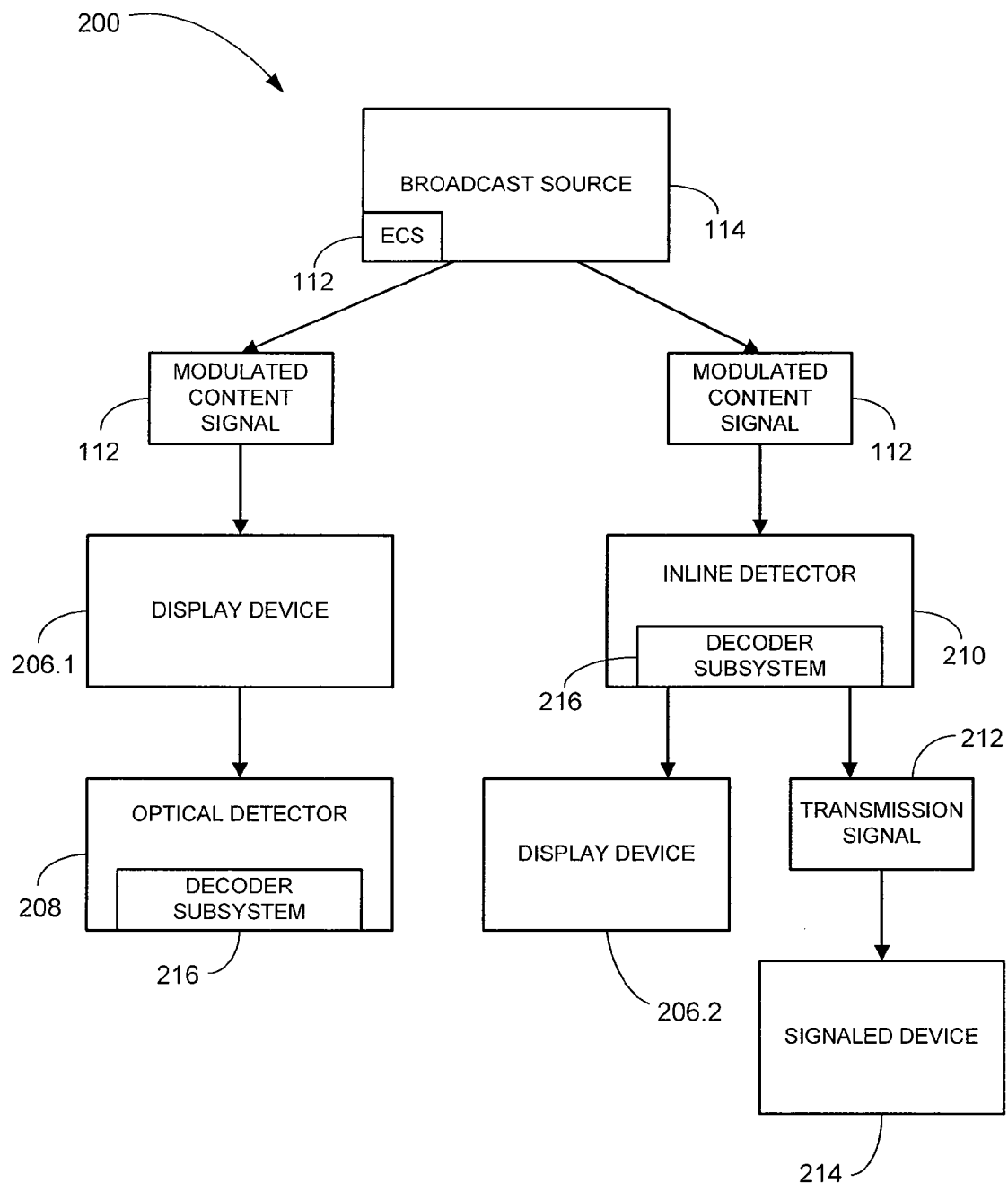
FIG. 2 is a block diagram illustrates an example detection system.

FIG. 2 illustrates an example detection system 200. The detection system 200 is an example platform in which one or more embodiments of a detection method may be used. However, other platforms may also be used.

The detection system 200 may send the modulated content signal 112 from the broadcast source 114 (see FIG. 1) to a display device 206.1 and/or an inline detector 210. The inline detector 210 may receive (e.g., electrically or optically) the modulated content signal 112 from the broadcast source 114, and thereafter may transmit a transmission signal 212 to a signaled device 214 and provide the modulated content signal 112 to a display device 206.2. An example embodiment of the inline detector 210 is described in greater detail below.

In an example embodiment, the inline detector 210 may detect the auxiliary data encoded within the modulated content signal 112 and transmit data regarding the auxiliary data or the auxiliary data itself to the signaled device 214 by use of the transmission signal 212 and provide the modulated content signal 112 to a display device 206.2. The transmission signal 212 may include a wireless radio frequency, infrared and direct wire connection, and other transmission mediums by which signals may be sent and received.

The signaled device 214 may be a device capable of receiving and processing the data transmitted by the transmission signal 212. The signaled device 214 may be a DVD recorder, PC based or consumer electronic based personal video recorder, and/or other devices capable of recording content to be viewed or any device capable of storing, redistributing and/or subsequently outputting or otherwise making the modulated content signal 112 available. The signaled device 214 may also be any device capable of implementing the detection method. For example, the signaled device 214 may be a hand-held device such as a portable gaming device, a mobile telephone, and/or a personal digital assistant (PDA). The signaled device 214 may optionally be made integral with the inline detector 210.

An optical detector 208 may receive and decode the auxiliary data from a display device 206.1. An implementation of the optical detector 208 is described in greater detail below.

The display devices 206.1, 206.2 may receive the modulated content signal 112 directly from the broadcast source 114 and/or indirectly through the inline detector 210. The display devices 206.1, 206.2 may be devices capable of presenting the content signal 104 (see FIG. 1) and/or the modulated content signal 112 to a viewer. Examples of the display devices 206.1, 206.2 may include projection televisions, plasma televisions, liquid crystal displays (LCD), personal computer (PC) screens, digital light processing (DLP), stadium displays, digital recorders (e.g., digital video recorders (DVRs), devices that may incorporate displays such as toys and personal electronics, and the like.

Figure 3:
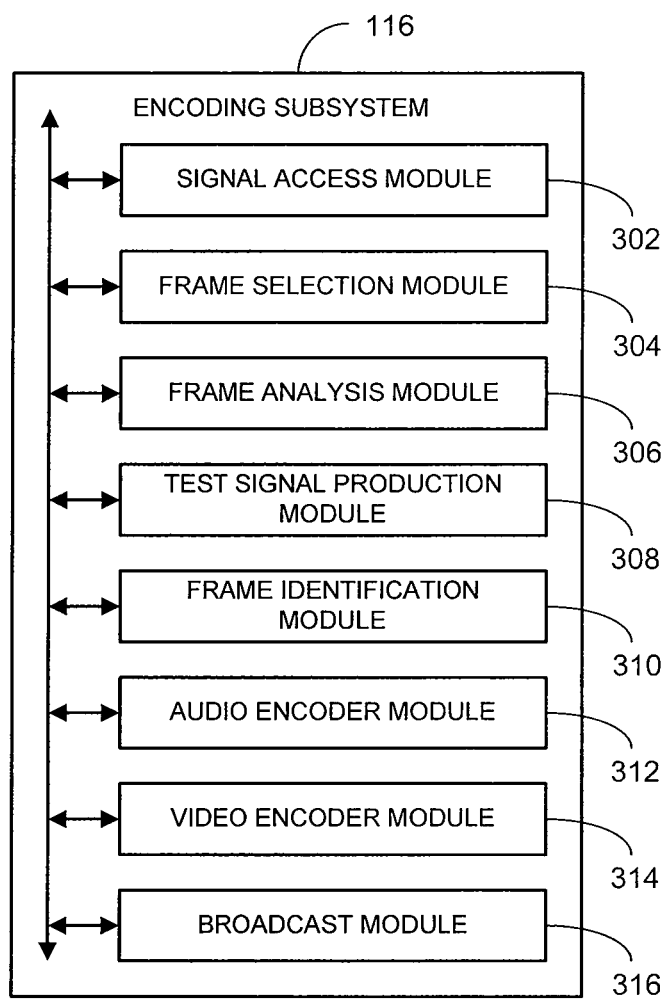
FIG. 3 is a block diagram of an example encoding subsystem that may be deployed in the encoding system of FIG. 1, according to an example embodiment.

FIG. 3 illustrates an example encoder subsystem 116, according to an example embodiment. The encoder subsystem 116 may be deployed in the encoder 106 (see FIG. 1) of the encoding system 100, or may be otherwise deployed.

The encoder subsystem 300 may include a signal access module 302, a frame selection module 304, a frame analysis module 306, a test signal production module 308, a frame identification module 310, an audio encoder module 312, a video encoder module 314, and/or a broadcast module 316. Other modules may also be included. In various embodiments, the modules may be distributed so that some of the modules may be deployed in the encoder 106 and some of the modules may be deployed in the signal source 102 and/or the broadcast source 114.

The signal access module 302 accesses the content signal 104 from the signal source 102. The frame selection module 304 selects frames for encoding.

The frame analysis module 306 analyzes frames of the content signal 104 based on a selection criterion to identify an audio frame selection, a video frame selection, and/or one or more frames.

The test signal production module 308 encodes an audio portion and a video portion of available frames of the content signal 104 with test data to produce a test content signal.

The frame identification module 310 identifies one or more audio enabled frames and one or more video enabled frames among the available frames. The one or more audio enabled frames and the one or more video enabled frames may be capable of being successfully decoded.

The audio encoder module 312 encodes auxiliary data in an audio portion of one or more frames of the content signal 104. The one or more frames may include video encoded frames or one or more frames associated with an audio frame selection. The audio portion may be encoded based on an audio encoding technique.

The video encoder module 314 encodes the auxiliary data in a video portion of the one or more frames. The one or more frames may include audio encoded frames or one or more frames associated with a video frame selection. The one or more frames may be encoded based on a video encoding technique. The video encoding technique may include chrominance modulation and/or luminance modulation. Other encoding techniques may also be used.

Figure 4:
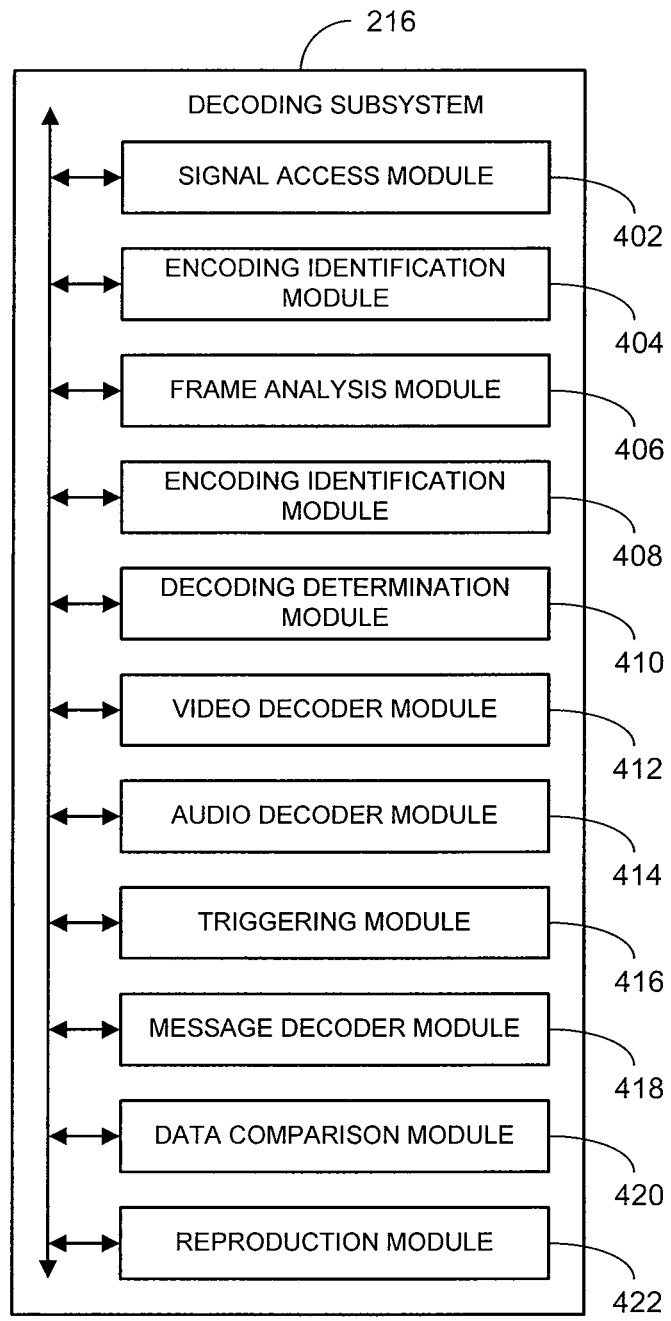
FIG. 4 is a block diagram of an example decoder subsystem that may be deployed in the detection system of FIG. 2, according to an example embodiment.

The broadcast module 316 broadcasts the modulated content signal. 112. The modulated content signal 112 may be produced (e.g., prior to broadcast) from encoding auxiliary data in the audio portion and the video portion and/or the audio frame selection and the video frame selection FIG. 4 illustrates an example decoder subsystem 216, according to an example embodiment. The decoder subsystem 216 may be deployed in the optical detector 208 and/or the inline detector 210 (see FIG. 2) of the detection system 200, or may be otherwise deployed.

The decoder subsystem 216 may include a signal access module 402, an encoding identification module 404, a frame analysis module 406, an encoding identification module 408, a decoding determination module 410, a video decoder module 412, an audio decoder module 414, a triggering module 416, a message decoder module 418, a data comparison module 420, and/or a reproduction module 422. Other modules may also be included. In various embodiments, the modules may be distributed so that some of the modules may be deployed in the optical detector 208 and/or the inline detector 210 and some of the modules may be deployed in the broadcast source 114, the display device 206.1, 206.2, and/or the signaled device 214.

The signal access module 402 accesses the modulated content signal 112 (e.g., from the broadcast source 114). The modulated content signal 112 may include encoded frames and/or dual encoded frames. The encoded frames may include the auxiliary data encoded within an audio portion of one or more audio encoded frames and the auxiliary data encoded within a vide portion of one or more video encoded frames. The dual encoded frames may include the auxiliary data encoded within an audio portion and a video portion of the dual encoded frames.

The encoding identification module 404 accesses an encoding identification of an audio frame selection and a video frame selection among the encoded frames. The frame analysis module 406 analyzes the dual encoded frames to identify an audio frame selection and a video frame selection based on a selection criterion.

The encoding identification module 408 accesses an encoding identification of an audio frame selection and a video frame selection among the dual encoded frames.

The decoding determination module 410 selects the video portion or the audio portion of a frame grouping of the dual encoded frames and determines whether the video portion or the audio portion of one or more remaining dual encoded frames can be decoded.

The video decoder module 412 decodes the video portion of the encoded frames and/or dual encoded frames. The dual encoded frames may be associated with a video frame selection. The decoding of the video portion may reproduce video encoded data. The video decoding technique may include chrominance decoding and/or luminance decoding. Other types of video decoding techniques may also be used.

The audio decoder module 414 decodes the audio portion of the encoded frames and/or dual encoded frames. The dual encoded frames may be associated with an audio frame selection. The decoding of the audio portion may reproduce audio encoded data.

The triggering module 416 triggers a video decoder based on reproduction of the message. The message decoder module 418 decodes an analysis frame portion of one or more analysis encoded frames (e.g., a video portion or an audio portion) of the modulated content signal to reproduce a message and decodes a message frame portion (e.g., an audio portion or a video portion) of one or more additional frames of the modulated content signal based on the message. The message frame portion of the one or more additional frames of the modulated content signal may be decoded based on the triggering of the video decoder.

The data comparison module 420 compares the video encoded data to the audio encoded data. The reproduction module 422 reproduces the auxiliary data. The auxiliary data may be reproduced from the decoding of a video portion and/or an audio portion of encoded frames and/or dual encoded frames. The auxiliary data may be reproduced based on the comparing. The auxiliary data may include video encoded data and/or audio encoded data.

Figure 5:
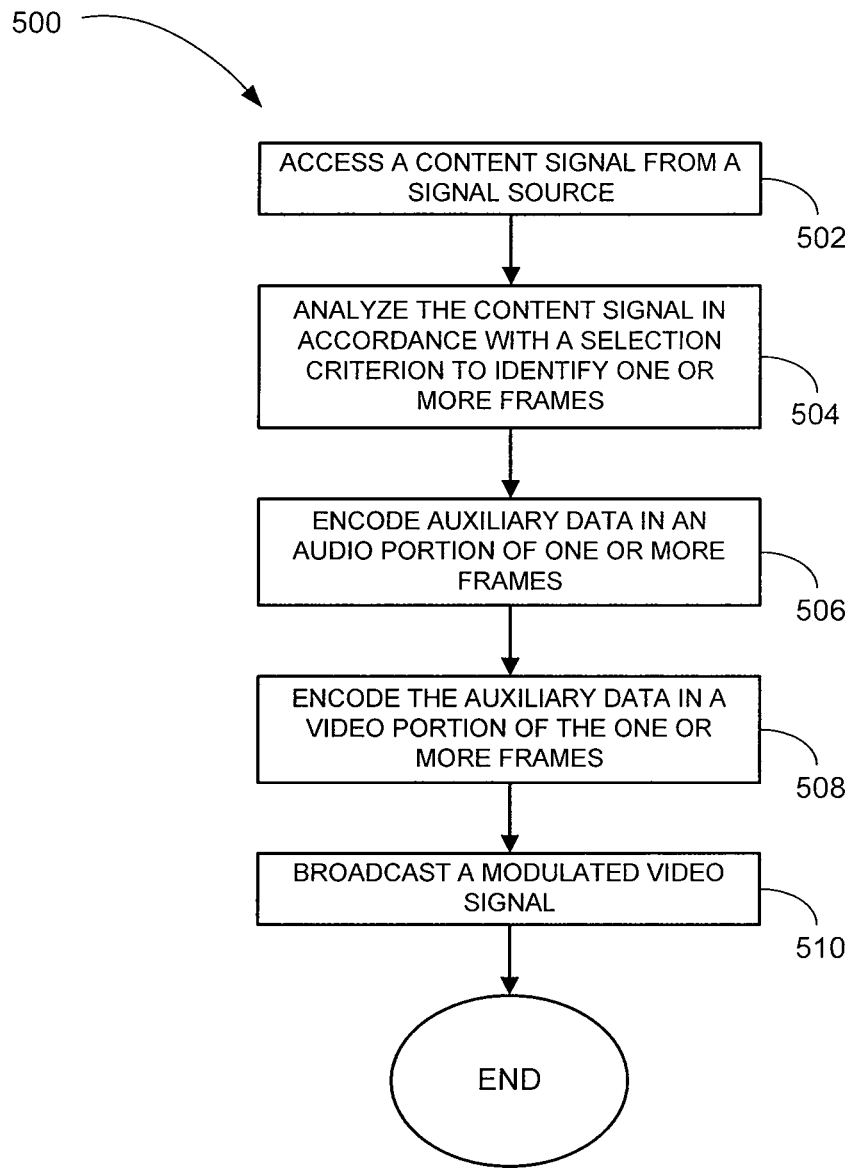
FIGS. 5-7 are flowcharts illustrating a method for dual channel encoding, according to an example embodiment.

FIG. 5 illustrates a method 500 for dual channel encoding, according to an example embodiment. The method 500 may be performed by the encoder subsystem 116 (see FIG. 1), or otherwise performed.

The content signal 104 may be accessed from the signal source 102 (see FIG. 1) at block 502. The content signal 104 may be accessed from a storage unit of the signal source locally, or may be remotely received via a transmission. The content signal may be otherwise received.

At block 504, a number of frames of the content signal 104 may be analyzed based on a selection criterion to identify one or more frames for encoding.

Auxiliary data is encoded in an audio portion of one or more frames (e.g., unencoded frames and/or video encoded frames) of the content signal 104 based on an audio encoding technique at block 506. The audio encoding technique may be dual tone multiple frequency (DTMF) modulation, frequency shift key (FSK) modulation, echo encoding modulation, or the like. Other types of time domain and/or frequency domain audio encoding techniques may be used.

The auxiliary data is encoded in a video portion of the one or more frames (e.g., unencoded frames and/or audio encoded frames) based on a video encoding technique at block 508. The video encoding technique may chrominance modulation, luminance modulation, or the like. The operations performed at block 506 and block 508 may occur in any order and/or simultaneously.

In an example embodiment, the encoding of the auxiliary data in the audio portion and the video portion during the operations at block 506 and block 508 may produce the modulated content signal 112. The modulated content signal 112 may include one or more dual encoded frames. The dual encoded frames may include auxiliary data encoded within the audio portion and the video portion of one or more frames.

The modulated content signal 112 may be broadcast from the broadcast source 114 (see FIGS. 1 and 2) at block 510.

Figure 6:
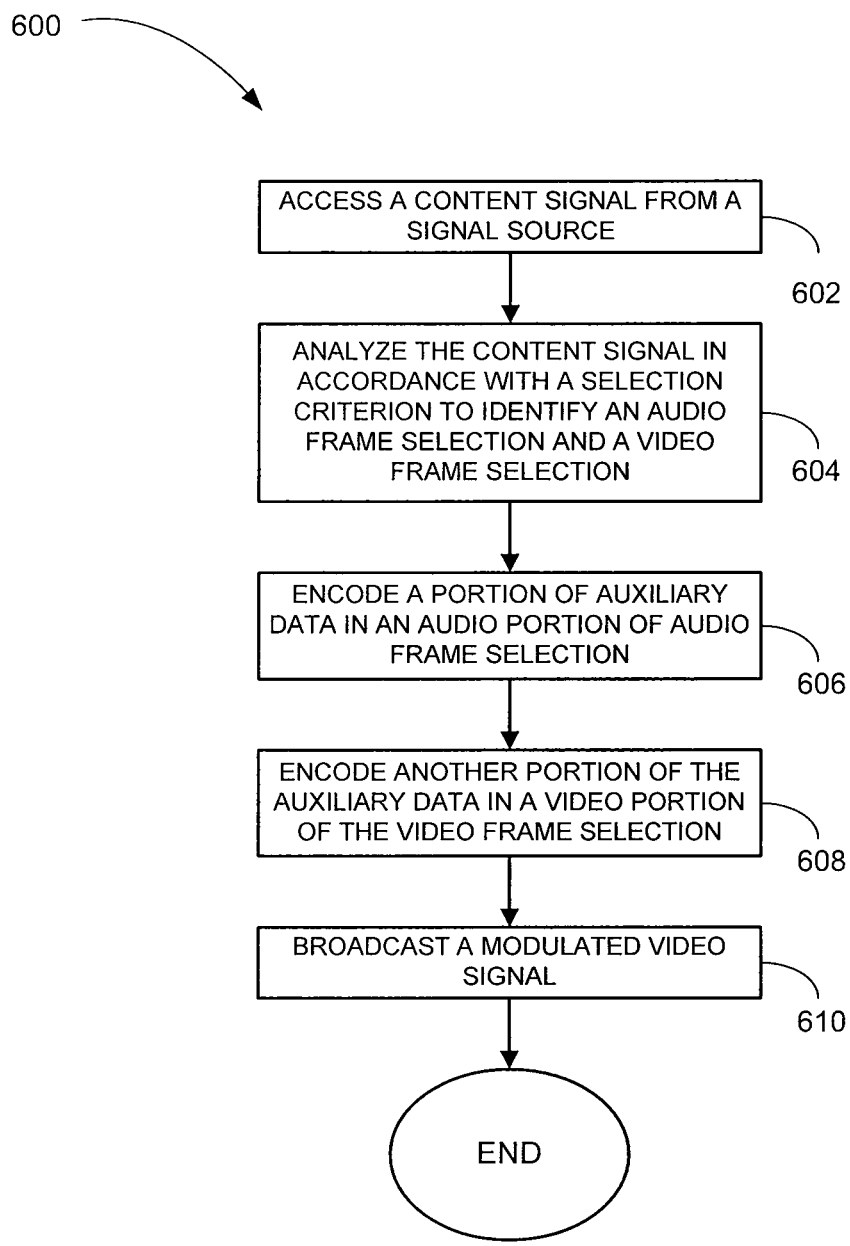

FIG. 6 illustrates a method 600 for dual channel encoding, according to an example embodiment. The method 600 may be performed by the encoder subsystem 116 (see FIG. 1), or otherwise performed.

The content signal 104 may be accessed from the signal source 102 (see FIG. 1) at block 602.

At block 604, frames of the content signal 104 are analyzed based on a selection criterion to identify an audio frame selection and a video frame selection. The frames of the content signal 104 selected by the audio frame selection may be the frames of the content signal 104 selected by the video frame selection or different frames. For example, a first set of frames of the content signal 104 may be the audio frame selection and a second set of frames of the content signal 104 may be the video frame selection. One or more frames of the audio frame selection may also be included in the video frame selection.

A portion of auxiliary data is encoded in an audio portion of the audio frame selection of the content signal 104 at block 606.

Another portion of the auxiliary data is encoded in a video portion of the video frame selection of the content signal 104 at block 608. The operations performed at block 606 and block 608 may occur in either order. The portion and the another portion of the auxiliary data may be the same portion or different portions of the auxiliary data.

In an example embodiment, the encoding of the audio frame selection and the video frame selection during the operations at block 606 and block 608 may produce the modulated content signal 112.

The modulated content signal 112 may be broadcast from the broadcast source 114 (see FIGS. 1 and 2) at block 610.

Figure 7:
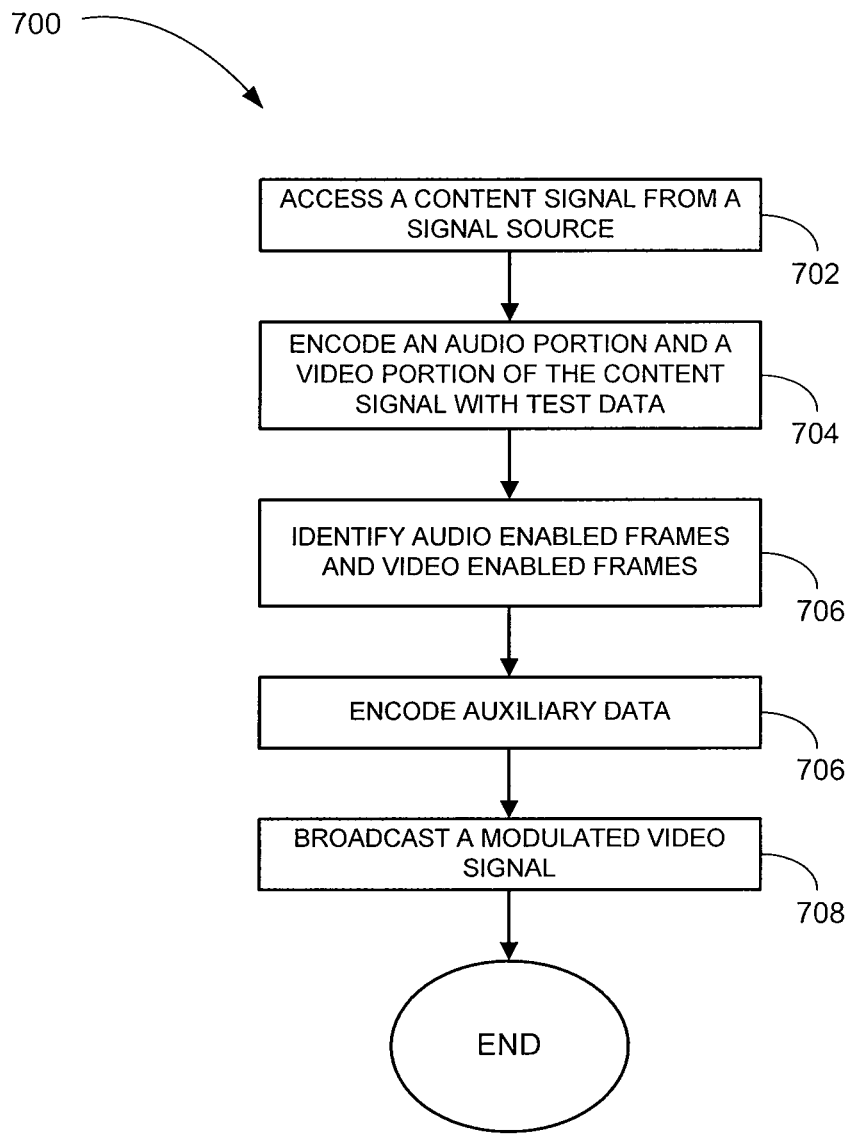

FIG. 7 illustrates a method 700 for dual channel encoding, according to an example embodiment. The method 700 may be performed by the encoder subsystem 116 (see FIG. 1), or otherwise performed.

The content signal 104 may be accessed from the signal source 102 (see FIG. 1) at block 702.

At block 704, an audio portion and a video portion of available frames of the content signal 104 are encoded with test data to produce a test content signal. The audio portion may be encoded based on an audio encoding technique and/or the video portion may be encoded based on a video encoding technique.

The audio decoding technique may include dual tone multiple frequency (DTMF) decoding, frequency shift key (FSK) decoding, echo encoding decoding, or the like. The video decoding technique may include chrominance decoding and/or luminance decoding. Other types of video decoding techniques and/or audio decoding techniques may also be used.

One or more audio enabled frames and one or more video enabled frames are identified from among the available frames at block 706. The audio enabled frames and the video enabled frames may be capable of being successfully encoded with the auxiliary data and subsequently decoded.

In an example embodiment, the audio enable frames and/or the video enabled frames may be identified by decoding the test data from the test content signal to identify one or more audio enabled frames and one or more video enabled frames among the available frames. The audio enabled frames and one or more video enabled frames may also be identified in other ways.

Auxiliary data is encoded in one or more audio enabled frame and/or video enabled frames at block 706. The encoding of the auxiliary data in the content signal 104 may produce the modulated content signal 112.

The modulated content signal 112 may be broadcast from the broadcast source 114 (see FIGS. 1 and 2) at block 708.

Figure 8:
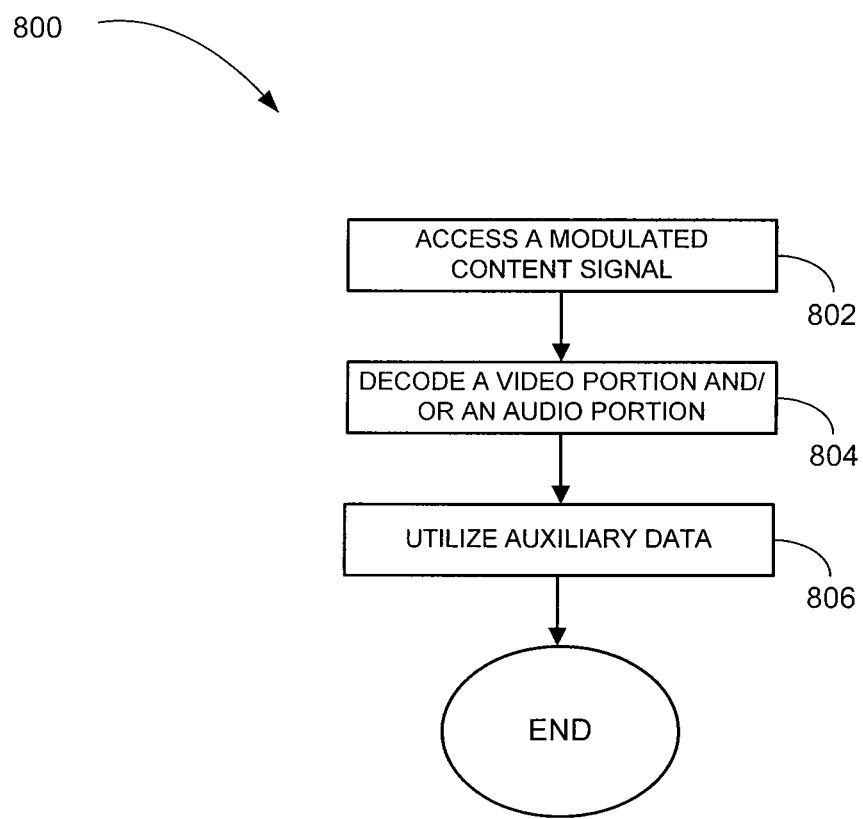
FIG. 8 is a flowchart illustrating a method for dual channel decoding, according to an example embodiment.

FIG. 8 illustrates a method 800 for dual channel decoding, according to an example embodiment. The method 800 may be performed by the decoder subsystem 216 (see FIG. 2), or otherwise performed.

The modulated content signal 112 is accessed at block 802. The modulated content signal 112 may include encoded frames and/or dual encoded frames. The encoded frames may include the auxiliary data encoded within an audio portion of one or more audio encoded frames and the auxiliary data encoded within a vide portion of one or more video encoded frames. The dual encoded frames may include the auxiliary data encoded within an audio portion and a video portion of the dual encoded frames.

The video portion and/or the audio portion of the encoded frames and/or dual encoded frames are decoded at block 804 to reproduce the auxiliary data. An example of portion decoding is described in greater detail below.

The auxiliary data may be utilized at block 806. For example, the auxiliary data may be utilized by the optical detector 208 and/or provided to the signaled device 214 (see FIG. 2).

Figure 9:
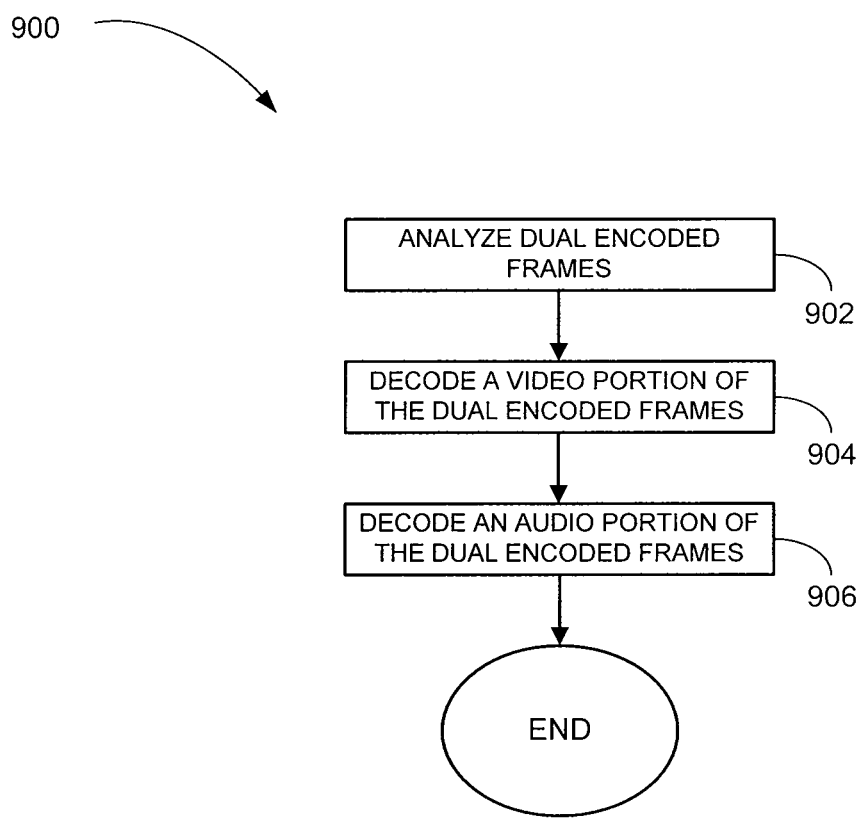
FIGS. 9-14 are flowcharts illustrating a method for portion decoding, according to an example embodiment.

FIG. 9 illustrates a method 900 for portion decoding, according to an example embodiment. The method 900 may be performed by at block 804 (see FIG. 8), or otherwise performed.

At block 902, the dual encoded frames are analyzed to identify an audio frame selection and a video frame selection based on a selection criterion.

The video portion of the dual encoded frames associated with the video frame selection is decoded at block 904. The audio portion of the dual encoded frames associated with the audio frame selection is decoded at block 906. The operations performed at block 904 and block 906 may occur in any order or simultaneously. The decoding of the audio portion and the video portion may reproduce the auxiliary data associated with the modulated content signal 112.

Figure 10:
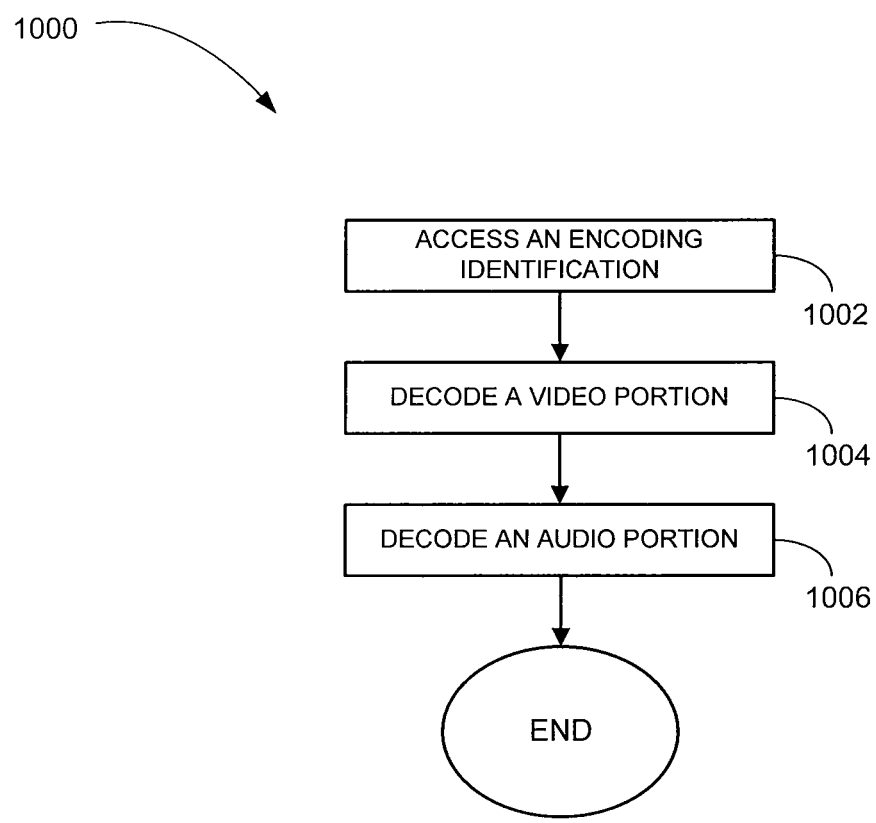

FIG. 10 illustrates a method 1000 for portion decoding, according to an example embodiment. The method 1000 may be performed by at block 804 (see FIG. 8), or otherwise performed.

An encoding identification of an audio frame selection and a video frame selection among the encoded frames and/or dual encoded frames is accessed at block 1002.

The video portion of the encoded frames or dual encoded frames associated with the video frame selection is decoded at block 1004. The audio portion of the encoded frames or dual encoded frames associated with the audio frame selection is decoded at block 1006. The operations performed at block 1004 and block 1006 may occur in any order or simultaneously. The decoding of the audio portion and the video portion may reproduce the auxiliary data associated with the modulated content signal 112.

Figure 11:
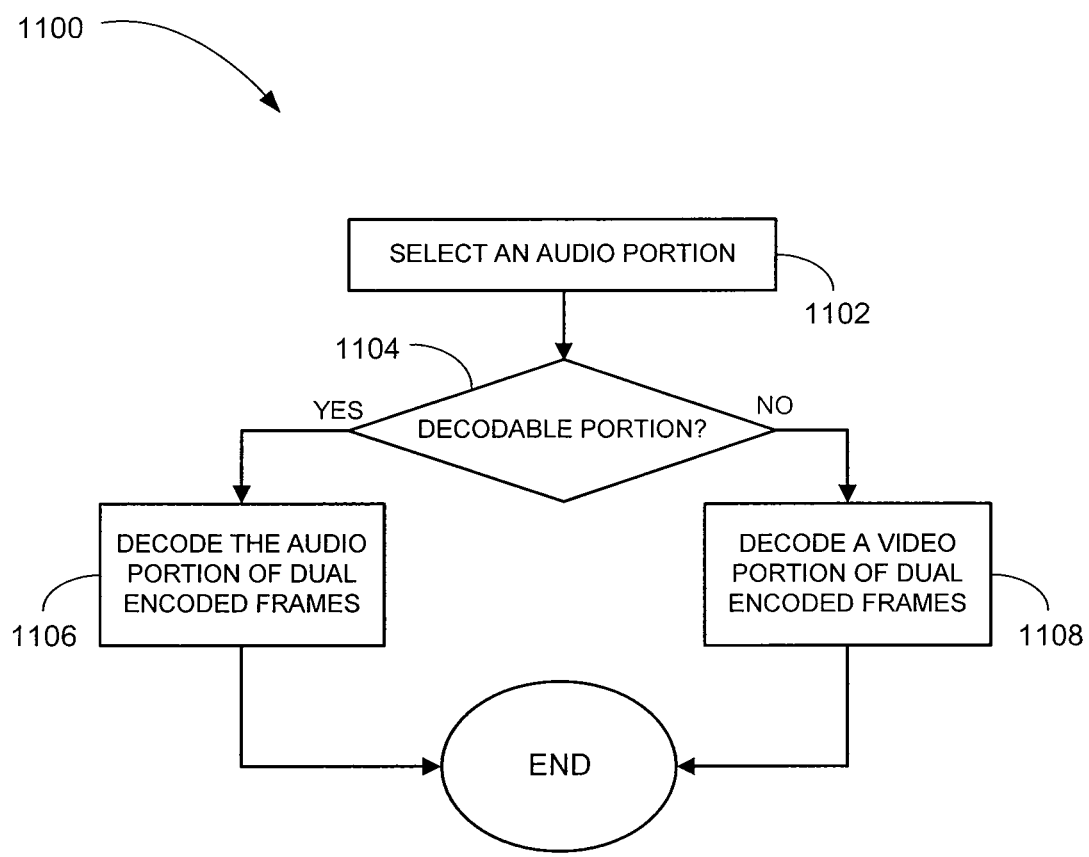

FIG. 11 illustrates a method 1100 for portion decoding, according to an example embodiment. The method 1100 may be performed by at block 804 (see FIG. 8), or otherwise performed.

The audio portion of a frame grouping of the dual encoded frames is selected at block 1102.

At decision block 1104, a determination may be made as to whether the audio portion of one or more remaining dual encoded frames can be decoded. If a determination is made that the audio portion of the dual encoded frames can be decoded, the audio portion of the dual portion of encoded frames may be decoded at block 1106 to reproduce the auxiliary data. If a determination is made at decision block 1104 that the audio portion cannot be decoded, the video portion of one or more remaining dual encoded frames may be decoded at block 1108 to reproduce the auxiliary data.

Figure 12:
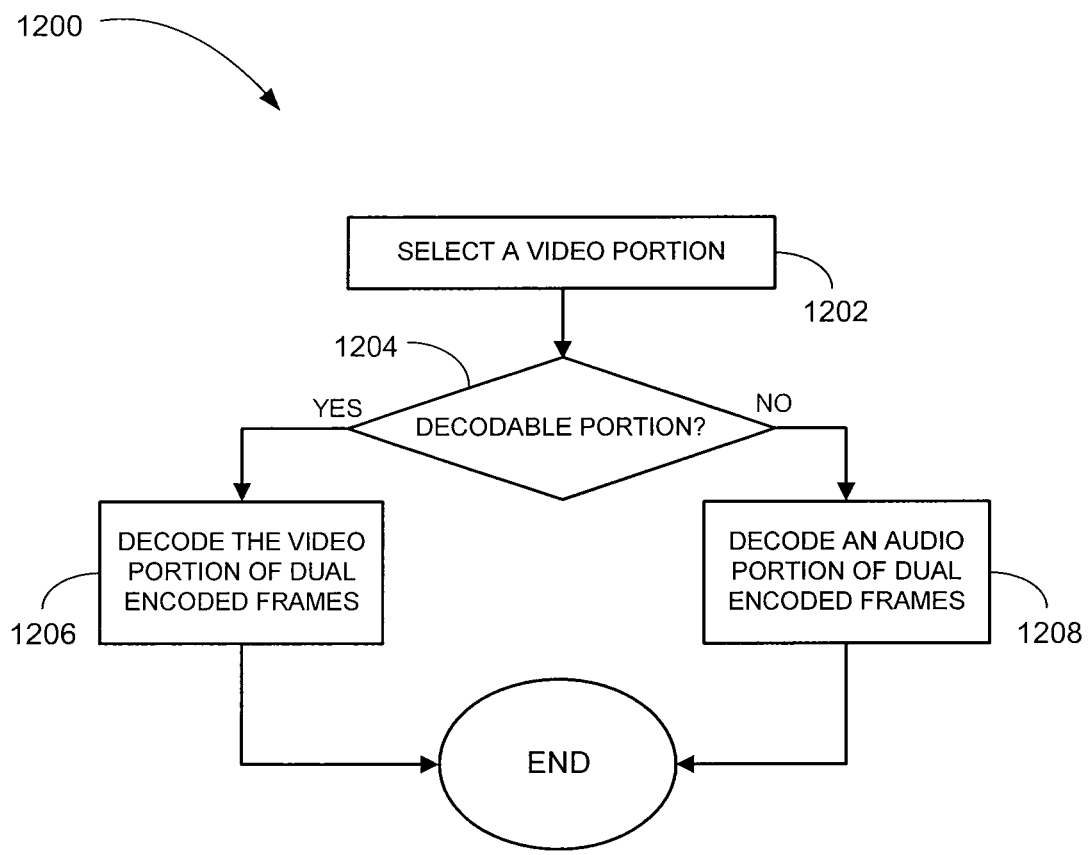

FIG. 12 illustrates a method 1200 for portion decoding, according to an example embodiment. The method 1200 may be performed by at block 804 (see FIG. 8), or otherwise performed.

The video portion of a frame grouping of the dual encoded frames is selected at block 1202.

At decision block 1204, a determination may be made as to whether the video portion of one or more remaining dual encoded frames can be decoded. If a determination is made that the video portion of the dual encoded frames can be decoded, the video portion of the dual portion of encoded frames may be decoded at block 1206 to reproduce the auxiliary data. If a determination is made at decision block 1204 that the video portion cannot be decoded, the audio portion of one or more remaining dual encoded frames may be decoded at block 1208 to reproduce the auxiliary data. Upon completion of the operations at block 1206 or block 1208, the method 1200 may terminate.

Figure 13:
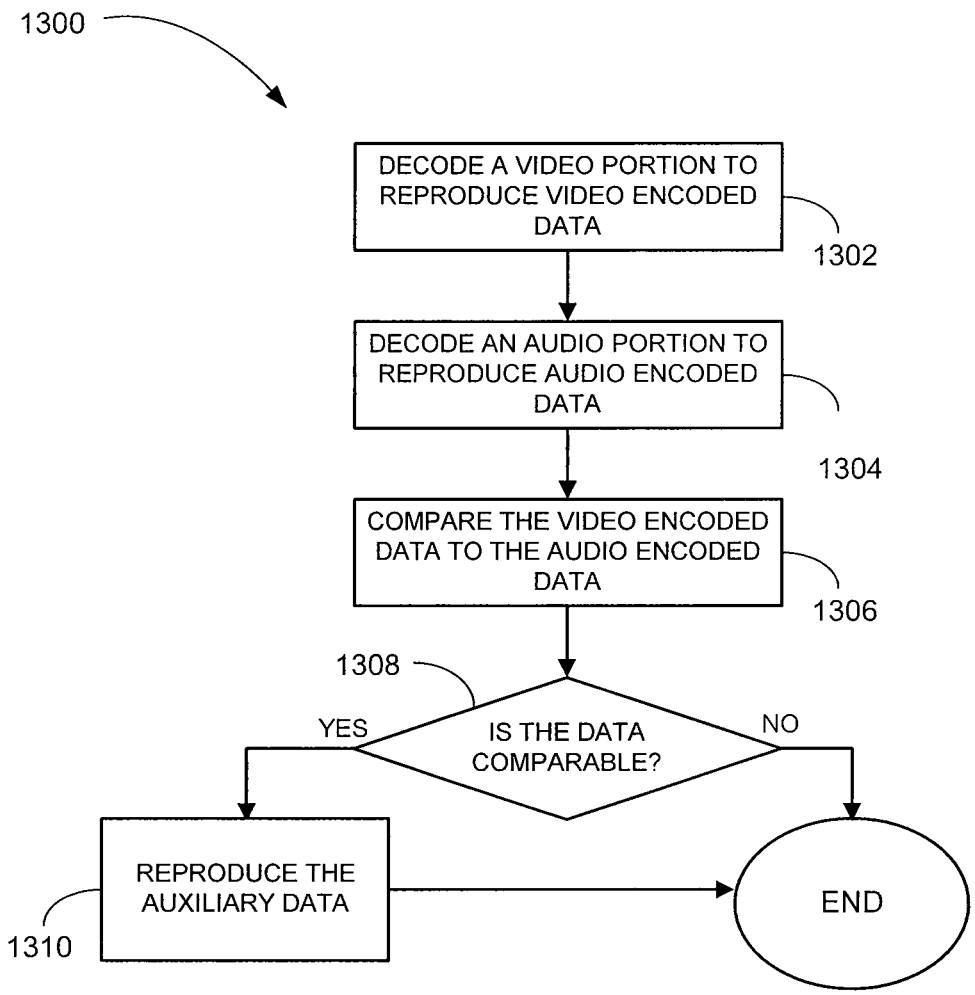

FIG. 13 illustrates a method 1300 for portion decoding, according to an example embodiment. The method 1300 may be performed by at block 804 (see FIG. 8), or otherwise performed.

At block 1302, a video portion of the dual encoded frames is decoded based on a video decoding technique to reproduce video encoded data.

At block 1304, an audio portion of the dual encoded frames is decoded based on an audio decoding technique to reproduce audio encoded data.

The video encoded data is compared to the audio encoded data at block 1306. At decision block 1308, a determination may be made as to whether the video encoded data is comparable to the audio encoded data. The data may be comparable when the video encoded data is identical, substantially similar, or otherwise based on the audio encoded data.

If a determination is made that the video encoded data is comparable to the audio encoded data, auxiliary data (e.g., the video encoded data and/or the audio encoded data) may be reproduced at block 1310. If a determination is made that the video encoded data is not comparable to the audio encoded data at decision block 1308 or upon completion of the operations at block 1310, the method 1300 may terminate.

Figure 14:
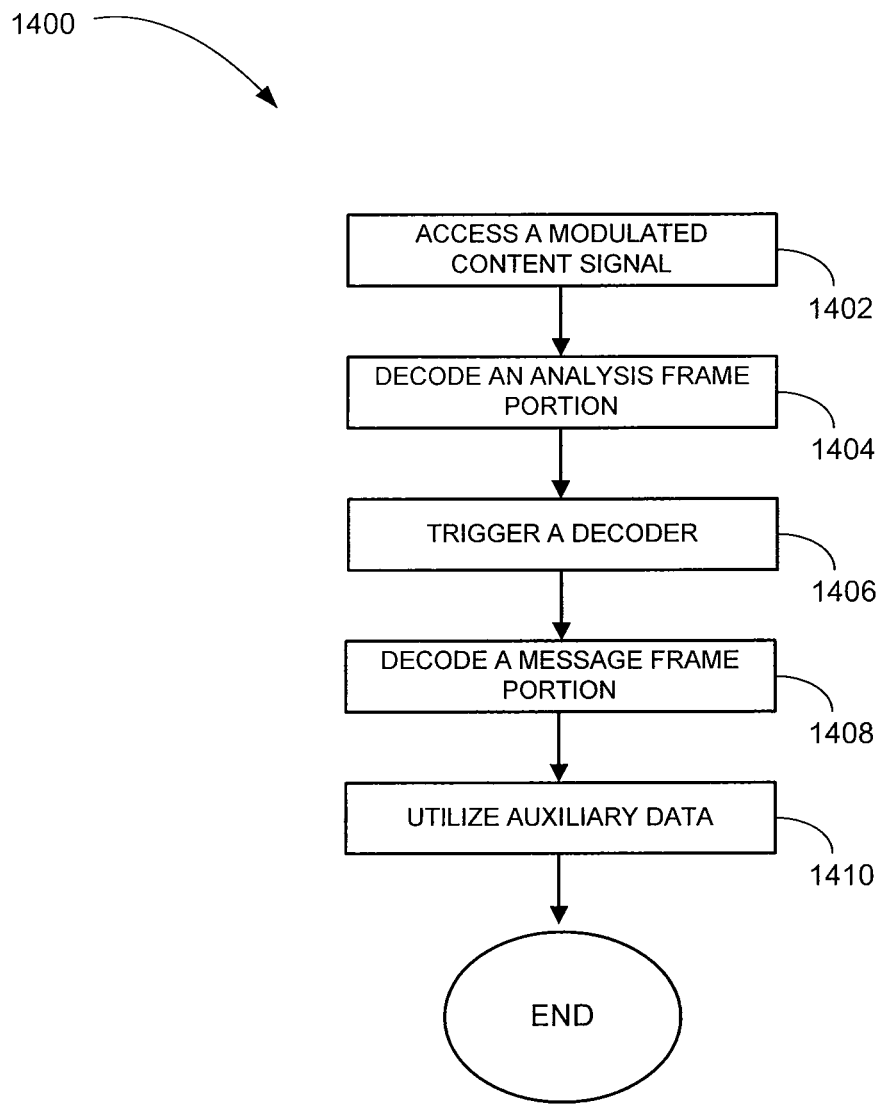

FIG. 14 illustrates a method 1400 for portion decoding according to an example embodiment. The method 1400 may be performed by at block 804 (see FIG. 8) or otherwise performed.

The modulated content signal 112 may be accessed at block 1402. At block 1404, an analysis frame portion of analysis encoded frames of the modulated content signal 112 may be decoded to reproduce a message.

The message may include verification data, content feature data, content aspect data, frame selection, pixel area, a rights assertion mark (e.g., to indicate rights associated with the modulated content signal 112), a hiding technique, or the like. The message may also include other types of information.

A video decoder or an audio decoder may be triggered based on reproduction of the message at block 1406. For example, the triggering may turn on the decoder to decode the auxiliary data in a different portion.

At block 1408, a message frame portion of one or more additional frames is decoded from the modulated content signal 112 based on the message and/or the triggering of the video decoder or audio decoder. The message frame portion of the one or more additional frames of the modulated content signal 112 may be decoded to reproduce auxiliary data associated with the modulated content signal 112 or otherwise decoded (e.g., to verify rights associated with the modulated content signal 112).

In an example embodiment, the analysis frame portion may be a video portion and the message frame portion may be an audio portion. The analysis frame portion may be an audio portion and the message frame portion may be a video portion.

Figure 15:
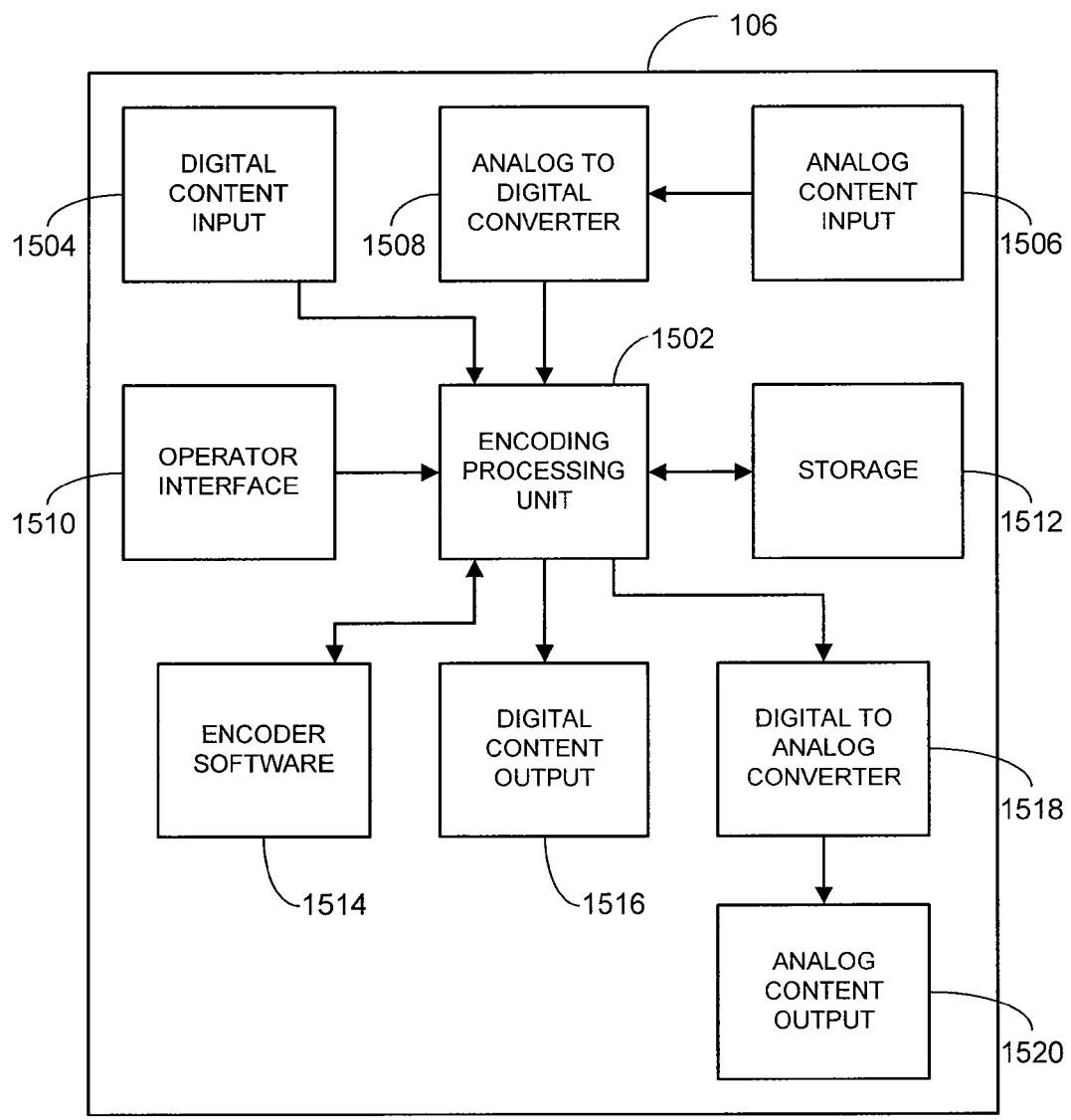
FIG. 15 is a block diagram of an example encoder that may be deployed in the encoding system of FIG. 1.

FIG. 15 illustrates an example encoder 106 (see FIG. 1) that may be deployed in the encoding system 100, or otherwise deployed. In general, the encoder 106 may be a computer with specialized input/output hardware, an application specific circuit, programmable hardware, an integrated circuit, an application software unit, a central process unit (CPU) and/or other hardware, firmware and/or software combinations.

The encoder 106 may include an encoder processing unit 1502 that may direct operation of the encoder 106. For example, the encoder processing unit 1502 may alter attributes of the content signal 104 to produce the modulated content signal 112.

A digital content input 1504 may be in operative association with the encoder processing unit 1502 and capable of receiving the content signal 104 from the signal source 102 (see FIG. 1). However, the encoder 106 may receive an analog content signal 104 through an analog content input 1506 and an analog-to-digital converter 1508. For example, the analog-to-digital converter 1508 may digitize the analog content signal 104 such that a digitized content signal 104 may be provided to the encoder processing unit 1502.

An operator interface 1510 may be operatively associated with encoder processing unit 1502 and may provide the encoder processing unit 1502 with instructions including where, when and/or at what magnitude the encoder 106 should selectively raise and/or lower a pixel value (e.g., the luminance and/or chrominance level of one or more pixels or groupings thereof at the direction of the operator 108 of FIG. 1) and/or alter the audio portion of the content signal. The instructions may be obtained by the operator interface 1510 through a port and/or an integrated operator interface. However, other device interconnects of the encoder 106 may be used including a serial port, universal serial bus (USB), "Firewire" protocol (IEEE 1394), and/or various wireless protocols. In an example embodiment, responsibilities of the operator 108 and/or the operator interface 1510 may be partially or wholly integrated with the encoder software 1514 such that the encoder 106 may operate in an automated manner.

When encoder processing unit 1502 receives operator instructions and the content signal 104, the encoder processing unit 1502 may store the luminance values, chrominance values and/or audio signal values as desired of the content signal 104 in storage 1512. The storage 1512 may have the capacity to hold and retain signals (e.g., frames and/or images of the content signal 104 and corresponding audio signals) in a digital form for access (e.g., by the encoder processing unit 1502). The storage 1512 may be primary storage and/or secondary storage, and may include memory.

After encoding the content signal 104, the encoder 106 may send the resulting modulated content signal 112 in a digital format through a digital video output 1516 or in an analog format by converting the resulting digital signal with a digital-to-analog converter 1518 and outputting the modulated content signal 112 by an analog video output 1520.

The encoder 106 need not include both the digital video input 1504 and the digital video output 1516 in combination with the analog video input 1506 and the analog video output 1520. Rather, a lesser number of the inputs 1504, 1506 and/or the outputs 1516, 1520 may be included. In addition, other forms of inputting and/or outputting the content signal 104 (and the modulated content signal 112) may be interchangeably used.

In an example embodiment, components used by the encoder 106 may differ when the functionality of the encoder 106 is included in a pre-existing device as opposed to a stand alone custom device. The encoder 106 may include varying degrees of hardware, firmware and/or software, as various components may interchangeably be used.

Figure 16:
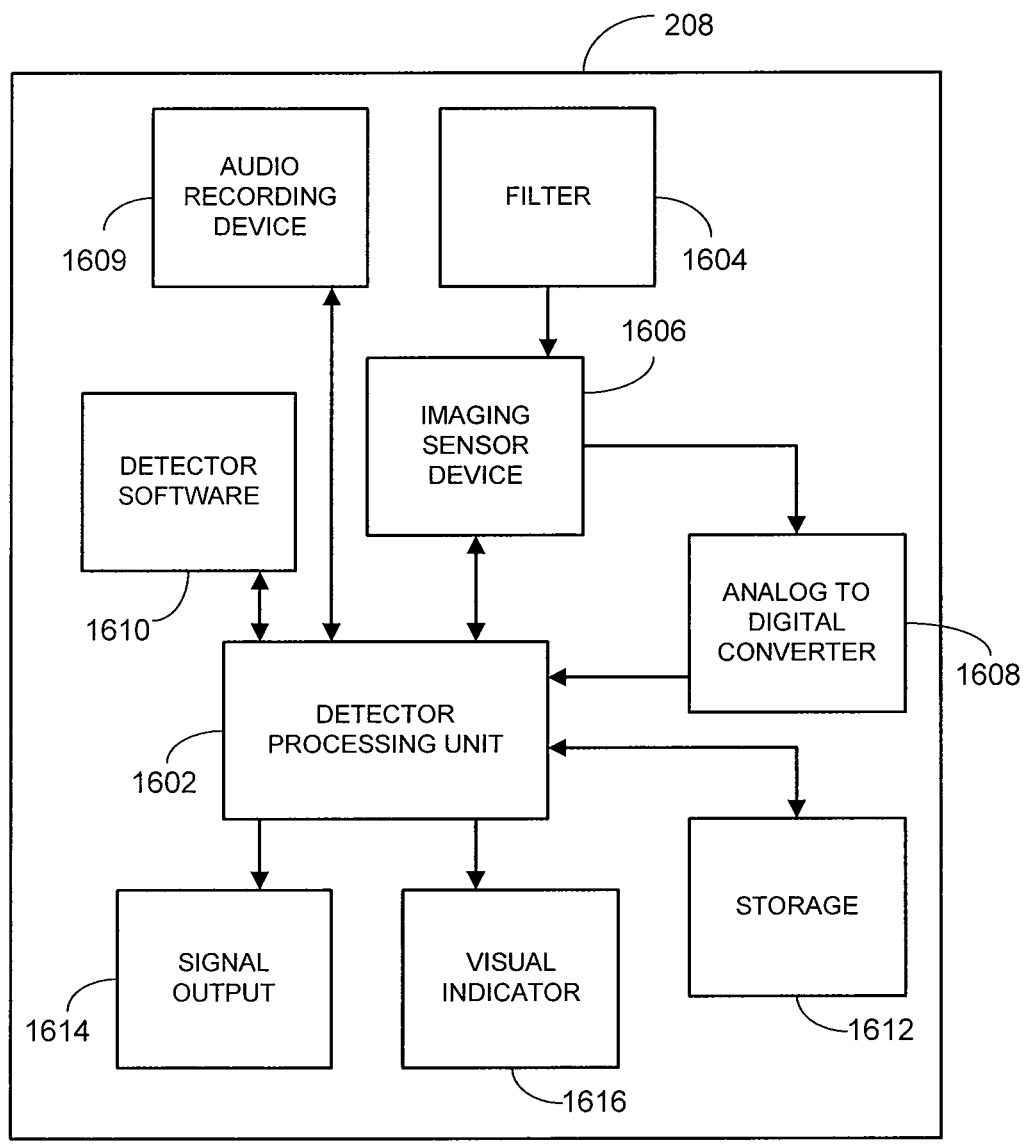
FIG. 16 is a block diagram of an example optical detector that may be deployed in the detection system of FIG. 2.

FIG. 16 illustrates an example optical detector 208 (see FIG. 2) that may be deployed in the detection system 200, or otherwise deployed.

The optical detector 208 may include an imaging sensor device 1606 operatively associated with an analog-to-digital converter 1608 and a detector processing unit 1602 to optically decode the modulated content signal 112 (e.g., as may be presented on the display device 206.1, 206.2 of FIG. 2).

In an example embodiment, the imaging sensor device 1606 may be a CMOS (Complimentary Metal Oxide Semiconductor) imaging sensor, while in another example embodiment the imaging sensor device may be a CCD (Charge-Coupled Device) imaging sensor.

The detector processing unit 1602 may be an application specific circuit, programmable hardware, integrated circuit, application software unit, and/or hardware, firmware and/or software combination. The detector processing unit 1602 may store the values (e.g., luminance, chrominance, luminance and chrominance, audio signal) of the modulated content signal 112 in storage 1612 and may detect pixels that have increased and/or decreased pixel values and/or alteration of the audio signal. The detector processing unit 1602 may process the modulated content signal 112 to detect the auxiliary data, test data, and/or message.

A filter 1604 may be placed over a lens of the imaging sensor device 1606 to enhance the readability of the auxiliary data, test data, and/or message contained within the modulated content signal 112. For example, an optical filter (e.g., a red filter or a green filter) may be placed over a lens of the imaging sensor device 1606. A digital filter and other types of filters may also be used.

An audio recording device 1609 may be communicatively coupled to the detector processing unit 1602 to receive the audio portion of the modulated content signal 112.

A signal output 1614 may be electrically coupled to the detector processing unit 1602 and provide a data output for the auxiliary data, test data, and/or message after further processing by the optical detector 208. For example, the data output may be one-bit data and/or multi-bit data.

A visual indicator 1616 may be further electrically coupled to the detector processing unit 1602 and may provide a visual and/or audio feedback to a user of the optical detector 208, which may by way of example include notice of availability of promotional opportunities based on the receipt of the message.

The detector processing unit 1602 may store the pixel values of the modulated content signal 112 in the storage 1612 and detect the alteration to the pixel values of the modulated content signal 112.

Figure 17:
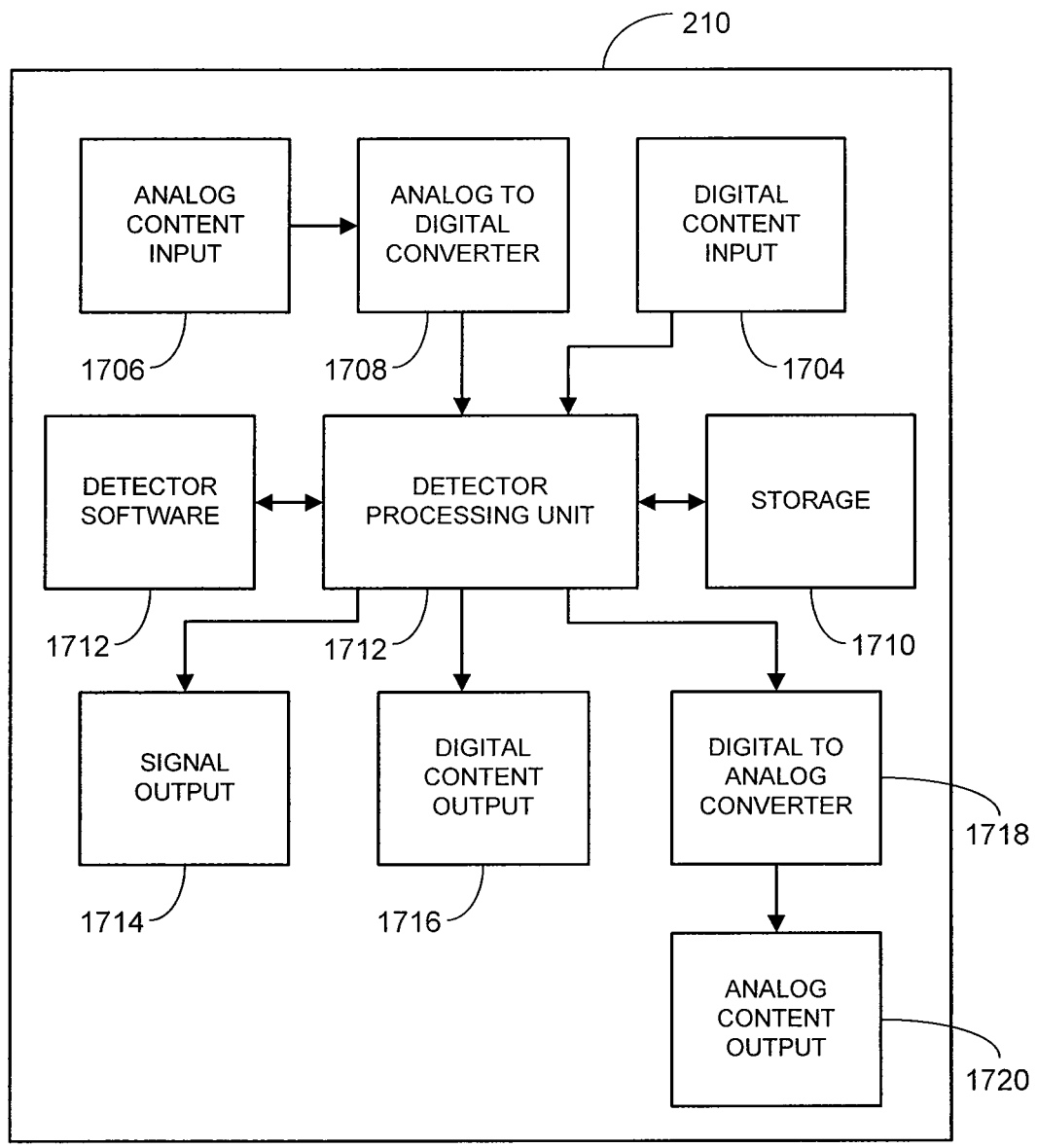
FIG. 17 is a block diagram of an example inline detector that may be deployed in the detection system of FIG. 2.

FIG. 17 illustrates an example inline detector 210 (see FIG. 2) that may be deployed in the detection system 200, or otherwise deployed.

The inline detector 210 may include an analog content input 1706 to receive the modulated content signal 112 from the broadcast source 114 when the modulated content signal 112 is an analog format, and a digital content input 1704 for receiving the modulated content signal 112 when the modulated content signal 112 is in a digital format. For example, the digital content input 1704 may directly pass the modulated content signal 112 to a detector processing unit 1702, while the analog content input 1706 may digitize the modulated content signal 112 by use of an analog-to-digital converter 1708 before passing the modulated content signal 112 to the detector processing unit 1702. However, other configurations of inputs and/or outputs of modulated content signal 112 may also be used.

The detector processing unit 1702 may process the modulated content signal 112 to decode auxiliary data, test data, and/or a message. The detector processing unit 1702 may be an application specific circuit, programmable hardware, integrated circuit, application software unit, and/or hardware and/or software combination. The detector processing unit 1702 may store the pixel values (e.g., luminance, chrominance, or luminance and chrominance) of the modulated content signal 112 in storage 1710 and may detect pixels that have increased or decreased pixel values and/or audio values that have been altered.

The auxiliary data, test data, and/or message may be transferred from the inline detector 210 to the signaled device 214 (see FIG. 2) by a signal output 1714. The inline detector 210 may optionally output the modulated content signal 112 in a digital format through a digital content output 1716 and/or in an analog format by first converting the modulated content signal 112 from the digital format to the analog format by use of an digital-to-analog converter 1718, and then outputting the modulated content signal 112 through an analog content output 1720. However, the inline detector 210 need not output the modulated content signal 112 unless otherwise desired.

Figure 18:
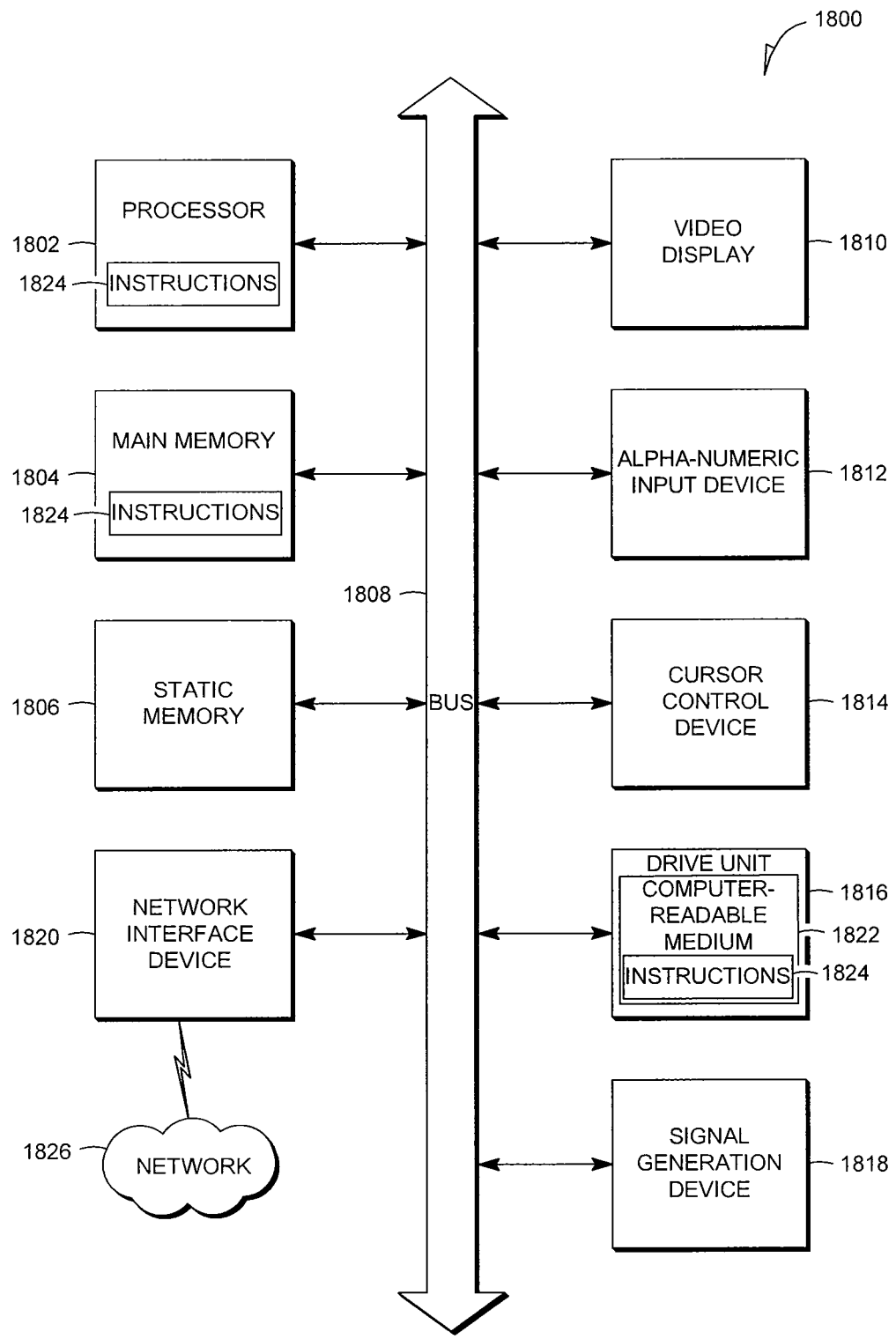
FIG. 18 is a block diagram of a machine in the example form of a computer system within which a set of instructions for causing the machine to perform one or more of the methodologies discussed herein.

FIG. 18 shows a diagrammatic representation of machine in the example form of a computer system 1800 within which a set of instructions may be executed causing the machine to perform any one or more of the methods, processes, operations, or methodologies discussed herein. The signal source 102, the encoder 106, the operator 108, the broadcast source 114, the optical detector 208, the inline detector 210, and/or the signaled device 214 may include the functionality of the computer system 1800.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a STB, a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU) a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a cursor control device 1814 (e.g., a mouse), a drive unit 1816, a signal generation device 1818 (e.g., a speaker) and a network interface device 1820.

The drive unit 1816 includes a machine-readable medium 1822 on which is stored one or more sets of instructions (e.g., software 1824) embodying any one or more of the methodologies or functions described herein. The software 1824 may also reside, completely or at least partially, within the main memory 1804 and/or within the processor 1802 during execution thereof by the computer system 1800, the main memory 1804 and the processor 1802 also constituting machine-readable media.

The software 1824 may further be transmitted or received over a network 1826 via the network interface device 1820.

While the machine-readable medium 1822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

In general, in a first aspect, an embodiment of the invention may feature encoding auxiliary data in an audio portion of one or more frames of a content signal based on an audio encoding technique. The auxiliary data is encoded in a video portion of the one or more frames based on a video encoding technique. The encoding of the auxiliary data in the audio portion and the video portion produces a modulated content signal. The modulated content signal includes one or more dual encoded frames. The dual encoded frames include the auxiliary data encoded within the audio portion and the video portion of the one or more frames.

In general, in a second aspect, an embodiment of the invention may feature analyzing a plurality of frames of a content signal based on a selection criterion to identify an audio frame selection and a video frame selection. A portion of auxiliary data is encoded in an audio portion of the audio frame selection of the content signal. Another portion of the auxiliary data is encoded in a video portion of the video frame selection of the content signal. The encoding of the audio frame selection and the video frame selection produce a modulated video signal.

In general, in a third aspect, an embodiment of the invention may feature encoding an audio portion and a video portion of a plurality of available frames of a content signal with test data to produce a test content signal. The audio portion is encoded based on an audio encoding technique. The video portion is encoded based on a video encoding technique. One or more audio enabled frames and one or more video enabled frames are identified among the plurality of available frames. The one or more audio enabled frames and the one or more video enabled frames are capable of being successfully decoded. The auxiliary data is encoded in at least one of an audio enabled frame, a video enabled frame, or combinations thereof.

In general, in a fourth aspect, an embodiment of the invention may feature accessing a modulated content signal. The modulated content signal includes a plurality of dual encoded frames. The plurality of dual encoded frames includes the auxiliary data encoded within an audio portion and a video portion of the plurality of dual encoded frames. At least one of the video portion, the audio portion or combinations thereof of the plurality of dual encoded frames is decoded to reproduce the auxiliary data.

In general, in a fifth aspect, an embodiment of the invention may feature accessing a modulated content signal. The modulated content signal includes a plurality of encoded frames. The plurality of encoded frames includes a portion of auxiliary data encoded within an audio portion of one or more audio encoded frames and another portion of auxiliary data encoded within a video portion of one or more video encoded frames. At least one of the video portion, the audio portion or combinations thereof of the plurality of encoded frames are decoded to reproduce the auxiliary data.

In general, in a sixth aspect, an embodiment of the invention may feature accessing a modulated content signal. An analysis frame portion of one or more analysis encoded frames of the modulated content signal is decoded to reproduce a message. A message frame portion of one or more additional frames of the modulated content signal is decoded based on the message.

In general, in a seventh aspect, an embodiment of the invention may feature a modulated content signal including a plurality of dual encoded frames. The plurality of dual encoded frames include the auxiliary data encoded within an audio portion and a video portion of the plurality of dual encoded frames.

Embodiments of the invention may include one or more of the following features.

The modulated content signal may be broadcast. The content signal may include a video signal. The audio encoding technique may include at least one of dual tone multiple frequency (DTMF) modulation, frequency shift key (FSK) modulation, echo encoding modulation, or combinations thereof. The video encoding technique may include at least one of chrominance modulation, luminance modulation, or combinations thereof. The auxiliary data encoded in the video portion of the one or more frames may be substantially invisible.

A plurality of frames of the content signal may be analyzed based on a selection criterion to identify the one or more frames. One or more frames of the content signal selected by the audio frame selection may be the one or more frames of the content signal selected by the video frame selection.

The auxiliary data may be encoded in a particular audio enabled frame of the one or more audio enabled frames, a particular video enabled frame of the one or more video enabled frames, or combinations thereof. The auxiliary data may be encoded in the one or more audio enabled frames and the one or more video enabled frames.

The test data may be decoded from the test content signal to identify the one or more audio enabled frames and the one or more video enabled frames among the plurality of available frames.

The plurality of dual encoded frames may be analyzed to identify an audio frame selection and a video frame selection based on a selection criterion. The video portion of the plurality of dual encoded frames associated with the video frame selection may be decoded. The audio portion of the plurality of dual encoded frames associated with the audio frame selection may be decoded. The decoding of the audio portion and the video portion may reproduce the auxiliary data.

An encoding identification of an audio frame selection and a video frame selection may be accessed among the plurality of dual encoded frames. The video portion of the plurality of dual frames associated with the video frame selection may be decoded. The audio portion of the plurality of dual frames associated with the audio frame selection may be decoded. The decoding of the audio portion and the video portion may reproduce the auxiliary data The video portion of a frame grouping of the plurality of dual encoded frames may be selected. A determination may be made that the video portion of one or more remaining dual encoded frames of the plurality of dual encoded frames cannot be decoded to reproduce the auxiliary data. The audio portion of the one or more remaining dual encoded frames may be decoded. The decoding of the audio portion may reproduce the auxiliary data.

The audio portion of a frame grouping of the plurality of dual encoded frames may be selected. A determination may be made that the audio portion of one or more remaining dual encoded frames of the plurality of dual encoded frames cannot be decoded. The video portion of one or more remaining dual encoded frames may be decoded. The decoding of the video portion may be used to reproduce the auxiliary data.

The video portion of the plurality of dual encoded frames may be decoded based on a video decoding technique to reproduce video encoded data. The audio portion of the plurality of dual encoded frames may be decoded based on an audio decoding technique to reproduce audio encoded data. The video encoded data may be compared to the audio encoded data. The auxiliary data may be reproduced based on the comparing. The auxiliary data may be at least one of video encoded data, audio encoded data, or combinations thereof.

An encoding identification of an audio frame selection and a video frame selection may be accessed among the plurality of encoded frames. The video portion of the plurality of encoded frames associated with the video frame selection may be decoded. The audio portion of the plurality of encoded frames associated with the audio frame selection may be decoded. The decoding of the audio portion and the video portion may reproduce the auxiliary data The message frame portion of the one or more additional frames of the modulated content signal may be decoded based on the message to reproduce auxiliary data encoded within the modulated content signal.

The analysis frame portion may be a video portion. The analysis frame portion may be an audio portion. The message frame portion may be an audio portion. The message frame portion may be a video portion.

The message may include verification data, content feature data, content aspect data, frame selection, pixel area, hiding technique, or combinations thereof. The message may include a rights assertion mark. The rights assertion mark may indicate rights associated with the content signal.

A video decoder may be triggered based on reproduction of the message. The decoding of the message frame portion of the one or more additional frames of the modulated content signal may be based on the triggering of the video decoder.

Thus, methods and systems for dual channel encoding and detection have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   encoding test data into a video portion of a content signal to determine which frames of the video portion can be used to encode auxiliary data in at least one of the video portion or an audio portion of the content signal;
   analyzing a plurality of the frames of the content signal based on a selection criterion to identify a display frame;
   encoding auxiliary data in the audio portion of the display frame of the content signal based on an audio encoding technique; and
   separately encoding the auxiliary data in the video portion of the display frame based on a video encoding technique, the video encoding technique altering an active portion of the display frame through a chrominance modulation video encoding technique, a luminance modulation video encoding technique, or both the chrominance modulation video encoding technique and the luminance modulation video encoding technique;
   wherein encoding of the auxiliary data in the audio portion and the video portion is based on analysis of the plurality of frames, and
   wherein encoding of the same auxiliary data in the audio portion and the video portion of the display frame produces a modulated content signal.

2. The method of claim 1, further comprising:
   broadcasting the modulated content signal.

3. The method of claim 1, wherein the audio encoding technique includes frequency shift key (FSK) modulation, echo encoding modulation, or a combination thereof.

4. The method of claim 1, wherein the video encoding technique includes chrominance modulation, luminance modulation, or a combination thereof.

5. The method of claim 1, wherein the auxiliary data encoded in the video portion of the display frame is substantially invisible in the active portion.

6. The method of claim 1, wherein the content signal includes a video signal.

7. The method of claim 1, wherein the auxiliary data is associated with content presented by the content signal.

8. The method of claim 1, wherein the auxiliary data includes a device triggering signal.

9. The method of claim 1, wherein the auxiliary data includes message data.

10. The method of claim 1, wherein the auxiliary data is encoded into the audio portion of the content signal using an audio encoder module that includes hardware circuitry and the same auxiliary data is separately encoded into the video portion of the content signal using a video encoder module that includes hardware circuitry and that is different from the audio encoder module.

11. A method comprising:
    encoding test data into a video portion of a content signal to determine which frames of the video portion can be used to encode auxiliary data in at least one of the video portion or an audio portion of the content signal;
    analyzing a plurality of the frames of the content signal based on a selection criterion to identify an audio frame selection and a video frame selection;
    encoding auxiliary data in the audio portion of the audio frame selection of the content signal; and
    separately encoding the auxiliary data in the video portion of the video frame selection of the content signal by altering an active portion of a display frame of the content signal through a chrominance modulation video encoding technique, a luminance modulation video encoding technique, or both the chrominance modulation video encoding technique and the luminance modulation video encoding technique;
    wherein encoding of the auxiliary data in the audio portion and the video portion is based on analysis of the plurality of frames, and
    wherein the encoding of the audio frame selection and the video frame selection produces a modulated content signal, the modulated content signal including one or more dual encoded frames, the dual encoded frames including the same auxiliary data within the audio portion and the video portion of the one or more dual encoded frames.

12. The method of claim 11, wherein one or more frames of the content signal included in the audio frame selection are the same one or more frames of the content signal included in the video frame selection.

13. The method of claim 11, wherein the auxiliary data that is encoded in the video portion of the content signal is substantially invisible.

14. The method of claim 11, wherein the one or more dual encoded frames are communicated for viewing on a display device.

15. The method of claim 14, further comprising further encoding the one or more dual encoded frames prior to communication.

16. The method of claim 15, wherein the one or more dual encoded frames are MPEG encoded and the one or more dual encoded frames are communicated for viewing on one or more televisions.

17. The method of claim 11, wherein the auxiliary data is encoded in the audio portion using dual tone multiple frequency (DTMF) modulation.

18. The method of claim 11, wherein the auxiliary data is encoded in the audio portion using at least one of frequency shift key (FSK) modulation or echo encoding modulation.

19. The method of claim 11, wherein the auxiliary data is encoded in the video portion using at least one of chrominance modulation or luminance modulation.

20. The method of claim 11, wherein the auxiliary data is encoded into the audio portion of the content signal using an audio encoder module that includes hardware circuitry and the same auxiliary data is separately encoded into the video portion of the content signal using a video encoder module that includes hardware circuitry and that is different from the audio encoder module.

* * * * *